United States Patent
Miyata

(10) Patent No.: US 11,048,121 B2
(45) Date of Patent: Jun. 29, 2021

(54) LIGHTING DEVICE AND DISPLAY DEVICE

(71) Applicant: SHARP KABUSHIKI KAISHA, Sakai (JP)

(72) Inventor: Hidekazu Miyata, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/796,188

(22) Filed: Feb. 20, 2020

(65) Prior Publication Data

US 2020/0285112 A1  Sep. 10, 2020

Related U.S. Application Data

(60) Provisional application No. 62/814,488, filed on Mar. 6, 2019.

(51) Int. Cl.
| | |
|---|---|
| *G02F 1/13357* | (2006.01) |
| *F21V 9/30* | (2018.01) |
| *G02F 1/1335* | (2006.01) |

(52) U.S. Cl.
CPC ........ *G02F 1/133605* (2013.01); *F21V 9/30* (2018.02); *G02F 1/1336* (2013.01); *G02F 1/133603* (2013.01); *G02F 1/133606* (2013.01); *G02F 1/133609* (2013.01); *G02F 1/133617* (2013.01); *G02F 1/133614* (2021.01); *G02F 2202/36* (2013.01)

(58) Field of Classification Search
CPC ............ G02F 2202/36; G02F 1/1336; G02F 1/133603; G02F 1/133606; G02F 1/133609; G02F 1/133617; G02F 1/133614; G02F 1/133605; F21V 9/30
See application file for complete search history.

(56) References Cited

U.S. PATENT DOCUMENTS

| | | | | |
|---|---|---|---|---|
| 8,430,519 B2* | 4/2013 | Takata | ............... | G02F 1/133605 362/97.1 |
| 8,511,845 B2* | 8/2013 | Jeong | ................ | G02F 1/133611 362/97.3 |
| 8,654,279 B2* | 2/2014 | Jeong | ...................... | F21V 21/00 349/62 |
| 10,613,383 B2* | 4/2020 | Kim | ........................ | F21V 11/16 |

(Continued)

FOREIGN PATENT DOCUMENTS

| | | |
|---|---|---|
| JP | 5026620 B2 | 9/2012 |
| JP | 6021967 B2 | 11/2016 |

*Primary Examiner* — Arman B Fallahkhair
(74) *Attorney, Agent, or Firm* — ScienBiziP, P.C.

(57) ABSTRACT

A lighting device includes a light source emitting primary light rays that are included in a certain wavelength region, a wavelength conversion member, and a reflection layer. The wavelength conversion member has a function of converting some of the primary light rays that have passed through the wavelength conversion member into secondary light rays that are included in another wavelength region that is different from the certain wavelength region. The reflection layer has a function of reflecting light rays that reach a first surface on an opposite side from the light source. The reflection layer includes a light transmission section in a portion thereof, and light rays that reach a second surface on a light source side pass through the light transmission section to the first surface at a higher ratio than other section of the reflection layer.

13 Claims, 10 Drawing Sheets

(56) References Cited

U.S. PATENT DOCUMENTS

| | | | |
|---|---|---|---|
| 2011/0164203 A1 | 7/2011 | Kimura | |
| 2012/0170253 A1* | 7/2012 | Park | G02F 1/133605 |
| | | | 362/97.1 |
| 2012/0307160 A1* | 12/2012 | Yokota | G02F 1/133707 |
| | | | 348/725 |
| 2013/0329401 A1* | 12/2013 | Yamamoto | F21V 13/12 |
| | | | 362/97.2 |
| 2015/0146436 A1* | 5/2015 | Heo | G02F 1/133605 |
| | | | 362/346 |
| 2015/0300576 A1 | 10/2015 | Matsuura | |

* cited by examiner

LIGHTING DEVICE AND DISPLAY DEVICE

CROSS REFERENCE TO RELATED APPLICATION

This application claims priority from U.S. Provisional Patent Application No. 62/814,48 flied on Mar. 6, 2019. The entire contents of the priority application are incorporated herein by reference.

TECHNICAL FIELD

The present technology relates to a lighting device and a display device.

BACKGROUND ART

A backlight unit mounted in a display device including a display panel that does not emit light and supplying light to the display panel has been known as one example of the lighting units. For example, Japanese Patent No. 5026620 discloses a planar light source that can be used in such a backlight unit. The planar light source includes: a plurality of light emitting elements that emit first colored light (primary light); a first reflecting member disposed behind the light emitting elements and reflecting the light; a diffusing member disposed in front of the light emitting elements and diffusing the light; a second reflecting member disposed in front of the diffusing member allowing a part of the light to reflect and pass therethrough; and a phosphor layer disposed between the first reflecting member and the second reflecting member and allowing a part of the first colored light to pass therethrough and converting another part of the first colored light into second colored light (secondary light) (converting a wavelength). The first colored light that has passed through the phosphor layer and the second colored light that has passed through the phosphor layer with wavelength conversion are mixed to emit white light. In such a configuration, a part of the light rays that have emitted by the light emitting elements is reflected by the first reflecting member and the second reflecting member multiple times repeatedly (so-called multiple reflection) and thereafter the light exits the planar light source. A part of the first colored light rays included in the light rays that have reflected multiple times is converted to the second colored light (so-called multiple wavelength conversion) every time passing through the phosphor layer. Therefore, the wavelength conversion amount of light rays converted from the first colored light to the second colored light in the exit light rays changes according to the number of passing times of the light passing through the phosphor layer or the passing distance of the phosphor layer through which the light passes. The light that has reflected multiple times normally travels farther away from the optical axis of the light emitting element. Therefore, the chromaticity of the planar light source becomes closer to the second colored light as the position is farther away from the optical axis of the light emitting element and, for example, color unevenness in a concentric ring shape may be caused. In the planar light source, the phosphor layer is configured in such a manner that the conversion rate of the colored light per a unit area is decreased as the position is farther away from the optical axis of each light emitting element. Accordingly, the wavelength conversion amount of the light rays that have reflected multiple times and exit the portion away from the optical axis is less likely to increase and the wavelength conversion amount of the light rays that do not reflect and directly exit the portion near the optical axis can be maintained. As a result, the change in the chromaticity caused by the multiple wavelength conversion is cancelled and the unevenness in the whole planar light source is less likely to be caused.

Furthermore, for example, Japanese Patent No. 6021967 discloses light source device that emits light through a light emitting surface and the light source device includes: a plurality of light sources provided respectively in a plurality of first division regions that configure region of the light emitting surface; a first suppression member for suppressing the light ted by the light source disposed in each of the first division regions from spreading into a direction parallel to the light emitting surface; a conversion member provided closer to the light emitting surface than the plurality of light sources and the first suppression member and for converting the color of the light emitted by the plurality of light sources and outputting the light of the converted color; a second suppression member provided closer to the light emitting surface than the conversion member and for suppressing the light output from the conversion member from spreading into a direction parallel to the light emitting surface for each of second division regions, each second division region including at least one first region; and a diffusion member provided closer to the light emitting surface than the conversion member while having a predetermined distance from the conversion member and for diffusing the light emitted from the conversion member. In the light source device, the light rays emitted by the light sources is suppressed from spreading and the light emitting region restricted within each division region where each light source is disposed to reduce brightness unevenness and color unevenness.

However, in the configuration described in Japanese Patent No. 5026620, the amount of light rays that are reflected multiple times through the phosphor layer and the number of passing times which the light passes through the phosphor layer are almost same as those in the prior art configuration. Therefore, the color unevenness is not sufficiently suppressed and can be further suppressed. In the configuration described in Japanese Patent No. 6021967, the directivity of the light is strong in each division region. Therefore, it is difficult to design the device in such a manner that borders between the division regions are not recognized and a thick diffuser member needs to used to obtain uniform planar light. Therefore, development of a lighting unit that can effectively suppress color unevenness with a simple structure has been demanded.

SUMMARY

The present technology was made in view of the above circumstances. An object of the technology described herein is to effectively suppress color unevenness in a lighting device and a display device.

A lighting device according to the technology described herein includes a light source emitting primary light rays that are included in a certain wavelength region, a wavelength conversion member disposed in a light exit direction of the primary light rays with respect to the light source, and a reflection layer disposed on an opposite side from the light source with respect to the wavelength conversion member. The wavelength conversion member has a function of converting some of the primary light rays that have passed through wavelength conversion member into secondary light ray that are included in another wavelength region that is different from the certain wavelength region. The reflection layer has a function of reflecting light rays that reach a first surface on an opposite side from the light source, The reflection layer includes light transmission section in a portion thereof, and light rays that reach a second surface on a light source side pass through the light transmission section to the first surface at a higher ratio than other section of the reflection layer.

A display device according to the technology described herein includes a display panel including an image display surface displaying an image and the lighting device.

According to the present technology, a lighting device and a display device in which color unevenness is effectively suppressed are obtained.

DETAILED DESCRIPTION

First Embodiment

Figure 1:
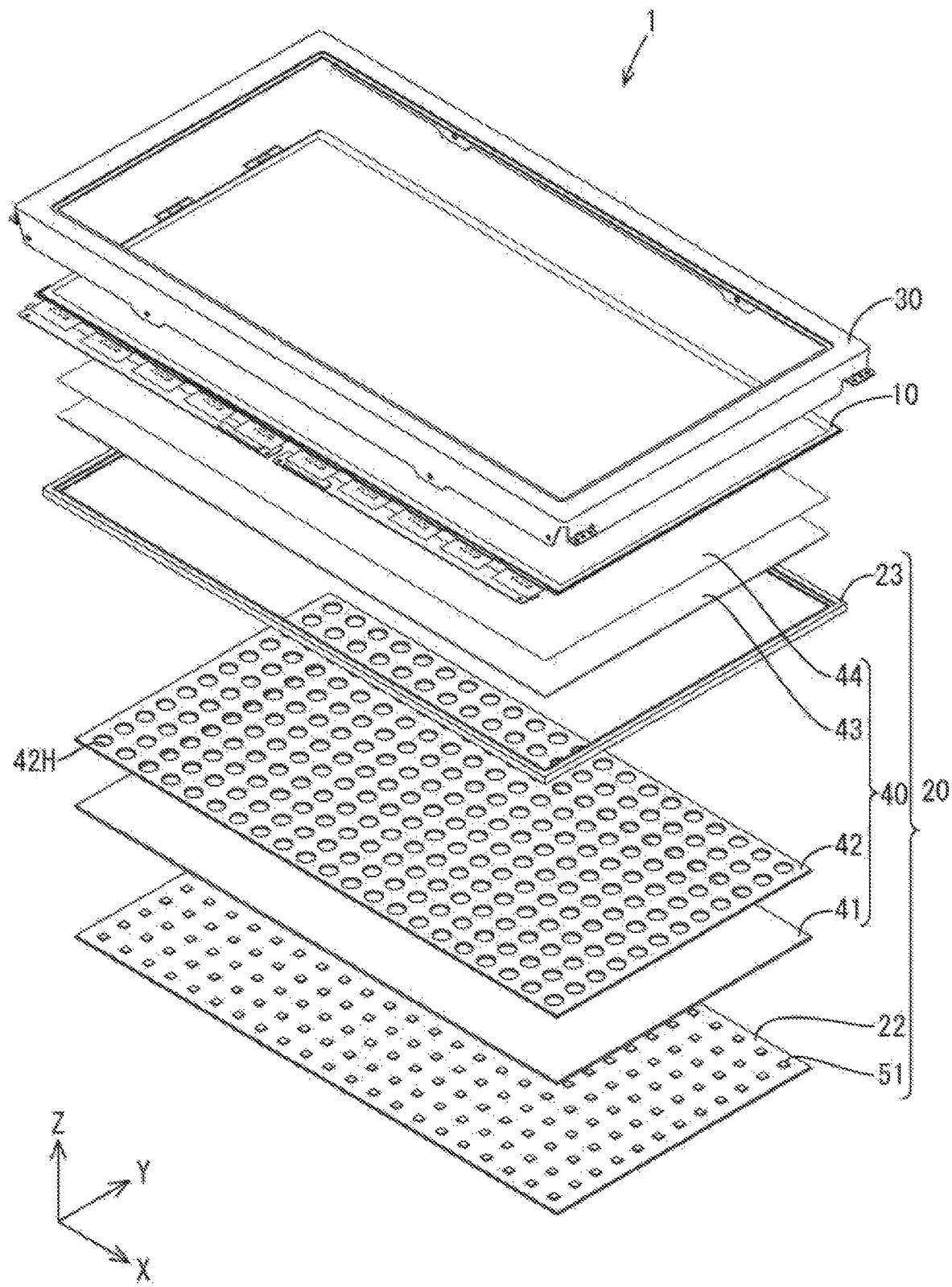
FIG. 1 is an exploded perspective view illustrating a general configuration of a liquid crystal display device according to a first embodiment.

A first embodiment will be described with reference to FIGS. 1 to 6.

In the section, a backlight unit 20 (one example of lighting unit) that is included in a liquid crystal display device 1 (one example of a display device) and mounted on a liquid crystal panel 10 (one example of a display panel) will be described as an example. X-axis, Y-axis and Z-axis may be present in the drawings and each of the axial directions represents a direction represented in each drawing. An upper side in FIG. 1 corresponds to a front side (a lower side corresponds to a back side). One of the same components is provided with a symbol and other ones may not be provided with the symbol.

The liquid crystal display device 1 according to the present embodiment is particularly suitable for display devices that are classified into a middle size to a large (extra-large) size and that have been demanded to increase image quality such as a note book personal computer (including a tablet-type note personal computer) and a television receiver. However, the present technology is not limited to such display devices and can be applied to display devices that are classified into a small-size display device or a medium-size display device having a screen size of several inches to some dozen centimeters. Recently, the image display devices have been demanded to improve image quality and the High Dynamic Range (HDR) technology has been focused on. To achieve the HDR in the liquid crystal display device, the local-dimming control of locally controlling the brightness level of the backlight unit is necessary. The present technology is not limited to but may be particularly and preferably applied to the liquid crystal display device 1 that performs the local-dimming technology to locally adjust the brightness level of the backlight device 20.

As illustrated in FIG. 1, the liquid crystal display device 1 includes the liquid crystal panel 10 displaying an image and a backlight unit 20 that is disposed on a back side with respect to the liquid crystal panel 10 and supplies light to the liquid crystal panel 10 for displaying. The liquid crystal panel 10 and the backlight unit 20 are integrally held by a bezel 30 of a frame shape. The liquid crystal display device 1 has a front side plate surface as an image display surface 10A displaying an image (see FIG. 2 and FIG. 3) and light exits the backlight unit 20 toward the front side where the liquid crystal panel 10 is arranged.

The liquid crystal panel 10 is not limited to particular ones and a liquid crystal panel having a known configuration can be used. Details of the liquid crystal panel 10 are not illustrated and described. For example, the liquid crystal panel 10 includes a pair of rectangular glass substrates that are bonded to each other while having a certain gap therebetween and a liquid crystal layer that is disposed between the substrates. The pair of glass substrates include an array substrate (an active matrix substrate) and a CF substrate (an opposing substrate). Switching components (for example, TFTs), pixel electrodes that are connected to the switching components, and an alignment film are disposed on the array substrate. The switching components are connected to gate lines and source lines that are perpendicular to each other. Color filters including color portions of red (R), green (G), and blue (B) that are arranged in certain arrangement, an opposing electrode, and an alignment film are disposed on the CF substrate. Polarizing plates are disposed on outer surfaces of the glass substrates, respectively.

Figure 2:
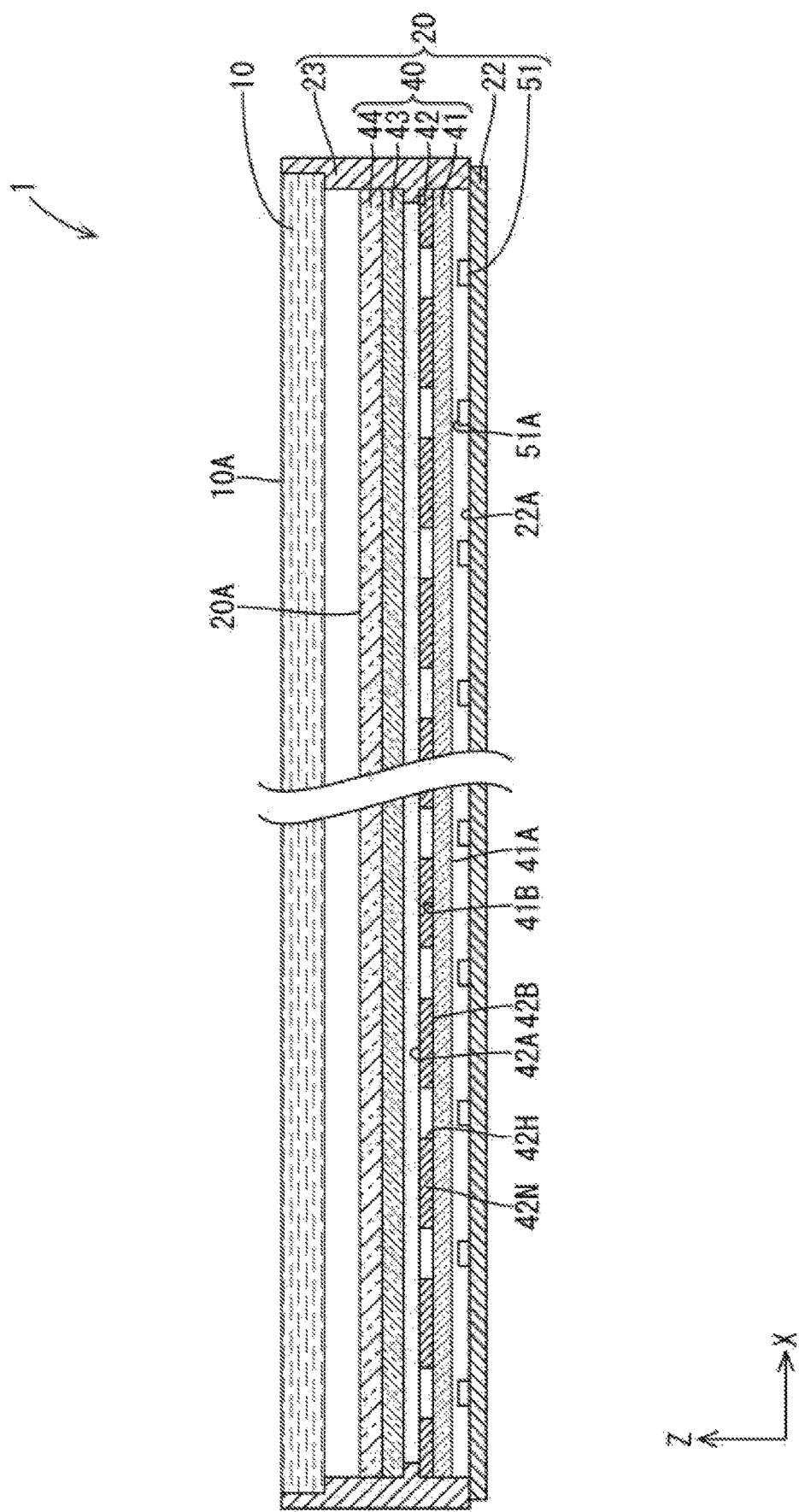
FIG. 2 is a cross-sectional view illustrating the general configuration of the liquid crystal display device.
Figure 3:
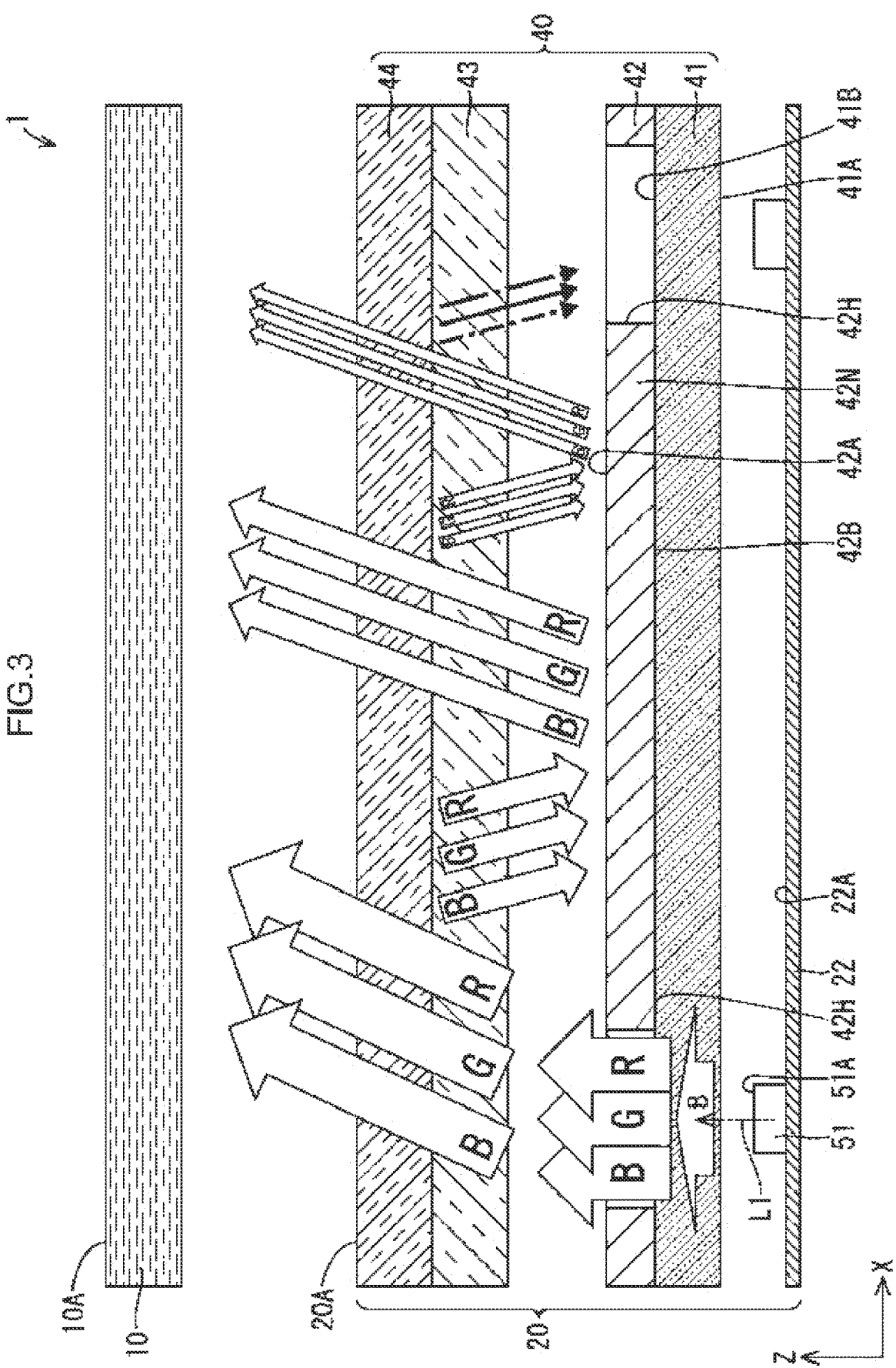
FIG. 3 is a schematic view illustrating a backlight unit with travelling images of light rays.

As illustrated in FIG. 1, the backlight unit 20 includes LEDs 51 (light emitting diodes, one example of light sources), a LED board 22 (one example of a light source board), an optical member 40 including a multiple sheets or a plate member, and a frame 23. The optical member 40 in the present embodiment includes a phosphor sheet 41 (one example of a wavelength conversion sheet) and a reflection sheet 42 (one example of a reflection layer). The optical member 40 has a rectangular shape that is similar to a plan view shape of the liquid crystal panel 10. As illustrated in FIG. 2, the optical member 40 is disposed to cover an opening of the frame 23 and disposed on a lower surface of the liquid crystal panel 10. The LEDs 51 are dispersedly arranged over an entire area of a plate surface of the LED board 22 that is disposed opposite the back surface of the optical member 40. As illustrated in FIGS. 2 and 3, in the backlight unit 20 according to the present embodiment, the LEDs 51 are arranged directly below the image display surface 10A of the liquid crystal panel 10 of the liquid crystal display device 1 and light emitting surfaces 51A (see FIG. 3) are opposite the liquid crystal panel 10. Namely, the backlight unit 20 is a so-called direct-type lighting unit. The bezel 30 is not illustrated in FIG. 2.

Components of the backlight unit 20 will be described in sequence.

The LEDs 51 are light sources that emit primary light included in a certain wavelength region and are arranged on a surface of the LED board 22 in such a manner that each optical axis matches a normal direction of the image display surface of the liquid crystal panel 10 (a normal direction of plate surface of the optical member 40). Here, "the optical axis" is an axis that matches a traveling direction of light rays having highest light emission intensity among the light rays emitted by the LEDs 51. As illustrated in FIGS. 2 and 3, in this embodiment, the light emitting surfaces 51A faces an opposite side from the LED board and so-called top-surface light emission type LEDs are used as the LEDs 51. Namely, in the backlight unit 20 according to the present embodiment, a front direction is an exit direction L1 of the primary light.

In the present embodiment, the LED 51 includes a unit member of a LED component chip that is a light emitting source. For example, the LED 51 is a so-called mini LED and has a cube shape having each side of about 0.1 mm to 0.3 mm. The present technology can be preferably applied to the lighting unit including the mind LEDs as the light source; however, the light sources are not limited to the ones having such a size. For example, the present technology may be applied to a lighting unit including normal LED chips of a cube shape having one side of several mm or more. In this embodiment, the LED 51 includes a blue LED chip (a blue light emitting component), a transparent sealant that seals the blue LED component, and a box casing in which the blue LED component and the sealant are arranged. The LED 51 is configured to emit blue light. The blue LED component is, for example, a semiconductor made of InGaN and is configured to emit light (blue light) in the wavelength region of blue light (about 420 nm to about 500 nm) as the primary light in response to the application of the forward voltage.

In this embodiment, the LED board 22 includes a base member and wiring. The base member is a rectangular plate and made of metal such as aluminum material. The wiring is formed on the surface of the base member via an insulation layer and is made of a metal film such as a copper foil. The base member of the LED board 22 may be made of insulating material such as glass epoxy and ceramics. The LED board 22 has a plate surface facing the front side (the optical member 40 side, the light exit direction) as a mounting surface 22A and the LEDs 51 are surface-mounted on the mounting surface 22A. The LEDs 51 are arranged in rows and columns (in a matrix, in a grid) within a surface area of the mounting surface 22A of the LED board 22 and are electrically connected to each other by the wiring that is arranged within the surface area of the mounting surface 22A. The intervals between the LEDs 51 are substantially same and the LEDs 51 are arranged at substantially equal intervals. The optical member 40, which covers the opening of the frame 23, is disposed opposite all of the LEDs 51 that are arranged as described above. Connectors to which the cables are connected are disposed on the LED board 22 and the LED board 22 is connected to an external power source via the cables and the driving power is supplied to the LED board 22. The number of LEDs 51 and the wiring formed on the LED board 22 are not particularly limited but may be preferably configured to perform the local dimming control. Namely, the LED board 22 is divided into multiple areas each including at least one light source, and an LED driving board (a light source driving board) is controlled to apply a specific current flow to each LED for every area and to locally adjust the brightness level.

A low reflecting layer is formed on an outermost surface and the mounting surface 22A of the LED board 22 in this embodiment (refer FIGS. 2 and 3) is a low reflecting surface. The low reflecting layer is less likely to reflect light. The mounting surface 22A is subjected to an antiglare (non-glossy) treatment to reduce the amount of light rays that are to be reflected compared to a mounting surface of a general light source board to obtain the low reflecting surface. For example, the mounting surface 22A is coated with a low reflecting resin layer including a light absorber or the outermost surface is subjected to the roughing treatment. The mounting surface 22A has the low reflecting surface over an entire surface thereof; however, the mounting surface 22A preferably has the low reflecting surface at least in an area except for the sections where the LEDs 51 are mounted. The mounting surface 22A is preferably configured such that 20% or less of the light rays that are supplied to the mounting surface 22A is to be reflected by the mounting surface 22A, more preferably 10% or less, and particularly preferably 5% or less.

The frame 23 illustrated in FIGS. 1 and 2 may be an injection molded object molded with resin, for example, a molded object molded with white polycarbonate resin. As illustrated in FIG. 1, the frame 23 in this embodiment has a frame shape that follows outer edges or the LED board 22 and the optical member 40. As illustrated in FIG. 2, the outer edge portion of the optical member 40 is held by the frame 23 and the outer edge portion of the LED board 22 is fixed to a back surface of the frame 23. This keeps the optical member 40 and the light emitting surfaces 51A of the LEDs 51 mounted on the LED board 22 in the predefined relative arrangement.

As illustrated in FIGS. 2 and 3, the optical member 40 is arranged on a front side of the LEDs 51 that are mounted on the LED board 22 while the light emitting surfaces 51A facing the front side, that is, on the exit direction L1 side of the primary light. The optical member 40 is arranged between the liquid crystal panel 10 and the LEDs 51 and adds predetermined optical effects to the light emitted by the LEDs 51. The optical member 40 includes multiple sheets or plates. In this embodiment, the optical member 40 includes the phosphor sheet 41, the reflection sheet 42, a diffuser sheet 43 (a light transmissive sheet), and a brightness enhancement sheet 44. The diffuser sheet 43 and the brightness enhancement sheet 44 may not be included and the optical member 40 is not limited to the one including such sheets. The optical member 40 may include other kinds of optical sheets such as a micro lens sheet and a polarizing reflection sheet instead of or in addition to the above sheets 43, 44. The optical member 40 may include multiple brightness enhancement sheets 44 or include the diffuser sheet 43 between the brightness enhancement sheets 44. To obtain different effects, the optical member 40 may further include an optical sheet (a dichroic filter) that provides effects of a Band-Pass filter. As illustrated in FIGS. 1 to 3, the optical member 40 in this embodiment includes the phosphor sheet 41, the reflection sheet 42, the diffuser sheet 43, and the brightness enhancement sheet 44 that are disposed on top of each other in this sequence from the back surface side to the front side, that is, from the LED 51 side to the exit direction L1 of the primary light (toward the liquid crystal panel 10).

Each of the components included in the optical member 40 will be explained. The brightness enhancement sheet 44 that is disposed on the uppermost side (the liquid crystal panel 10 side) of the optical member 40 has a function of enhancing brightness of the backlight unit 20. For example, the brightness enhancement sheet 44 is configured to include unit prisms that have an apex angle of 90 degrees and extend along one side and are arranged along another side that is perpendicular to the side without having any space therebetween. The brightness enhancement sheet 44 having such a configuration has an action of collecting light (an anisotropic light collecting action) selectively with respect to the direction along the other side (the arrangement direction of the unit prisms, the direction perpendicular to the extending direction of the unit prism). Brightness Enhancement film (BEF) (registered trademark) or Dual Brightness Enhancement film (DBEF) (registered trademark) produced by 3M may be used as the brightness enhancement sheet 44. In this embodiment, the front side plate surface of the brightness enhancement sheet 44 is a light exit surface 20A of the backlight unit 20 (refer FIGS. 2 and 3) and the light exits through the light exit surface 20A toward the liquid crystal panel 10.

The diffuser sheet 43 that is disposed on the back side of the brightness enhancement sheet 44 is one kind of the light transmissive sheets that transmit light. The light enters the diffuser sheet 43 through the back surface thereof (on the LED 51 side) and is diffused therein and exits the diffuser sheet 43 toward the front side (the liquid crystal panel 10 side). The diffuser sheet 43 has a function of uniformizing the amount of light rays emitted by the light source and outputting the light. The diffuser sheet 43 may include a base member made of substantially transparent resin and having a predefined thickness and a large number of diffuser particles that are diffused in the base member. The transparent resin base member is not limited to particular one but may be made of (meth)acrylic resin, polycarbonate resin, polystyrene resin, and polyvinyl chloride resin. Particularly, a resin sheet that is made of acrylic resin or polycarbonate resin and is good in transparency and shock resistance is preferably used. A relatively thick resin plate may be used as the base member. For example, Sumipex Opal plate (registered trademark) produced by Sumitomo Chemical Company, Limited may be used as the diffuser sheet 43.

The phosphor sheet 41 is disposed on the lowest side (on the back surface side, the LED 51 side) of the optical member 40 and adjacent to the LEDs 51. Some of the light rays emitted by the LEDs 51 pass through the phosphor sheet 41 in the thickness direction thereof and some of the light rays emitted by the LEDs 51 are absorbed by the phosphor sheet 41 and converted into secondary light included in another wavelength region and the converted light exits the phosphor sheet 41. The phosphor sheet 41 is preferably disposed so as to have substantially no space with respect to the light emitting surfaces 51A of the LEDs 51. Hereinafter, the phosphor sheet 41 has a back surface (on the LED 51 side) through which the primary light emitted by the LEDs 51 enters and a front surface (on the liquid crystal panel 10 side) through which the secondary light having a converted wavelength exits (refer FIGS. 2 and 3). The back surface is referred to as a primary light entering surface 41A and the front surface is referred to as a secondary light exit surface 41B. The configuration and the shape of the phosphor sheet 41 are not particularly limited; however, the phosphor sheet may include, for example, a wavelength conversion layer, a pair of support layers sandwiching the wavelength conversion layer, and a pair of barrier layers that are disposed on an outer side of the respective support layers and sandwich the wavelength conversion layer and the pair of support layers. The thickness of the phosphor sheet (the wavelength conversion sheet) will be described later.

The wavelength conversion layer of the phosphor sheet 41 includes acrylic resin as binder resin and quantum dot phosphors (one example of the phosphor) that are dispersed in the acrylic resin. The acrylic resin is transparent and has light transmissivity and adhering properties with respect to the support layer, which will be described later.

In this embodiment, the wavelength conversion layer includes green quantum dot phosphors and red quantum dot phosphors as the quantum dot phosphors. The green quantum dot phosphors are excited by absorbing the light emitted by the LEDs 51 (blue light, the primary light, excitation light) and emits green light (the wavelength range from about 500 nm to about 570 nm). The red quantum dot phosphors are excited by absorbing the light emitted by the LEDs 51 (blue light, the first light, excitation light) and emits red light (the wavelength range from about 600 nm to about 780 nm). Materials used for the quantum dot phosphors include a material prepared by combining elements that could be divalent cations such as Zn, Cd, and Pb and elements that could be divalent anions such as O, S, Se, and Te (e.g., cadmium selenide (CdCe), zinc sulfide (ZnS), a material prepared by combining elements that could be trivalent cations such as Ga and In and elements that could be trivalent anions such as P, As, and Sb (e.g., indium phosphide (InP), gallium arsenide (GaAs), and chalcopyrite-type compounds (CuInSe2).

In the present embodiment, the quantum dot phosphors (the green quantum dot phosphors and the red quantum dot phosphors) include color conversion components and the ratio of the color conversion components is adjusted such that white light is obtained by mixing the secondary light rays having wavelengths (colors) converted by the quantum dot phosphors. The quantum dot phosphors are evenly dispersed in the acrylic resin included in the wavelength conversion layer. The phosphors included in the phosphor sheet may be any phosphors that can covert the wavelength of the primary light in the certain wavelength region into the secondary light in a different wavelength region and are not limited to the quantum dot phosphors. The wavelength conversion layer may include other components such as a scattering agent.

The support layer of the phosphor sheet 41 is a sheet (a film) made of polyester resin such as polyethylene terephthalate (PET), for example. The quantum dot phosphors are phosphors that have high quantum efficiency. The quantum dot phosphors include semiconductor nanocrystals (e.g., diameters in a range from 2 nm to 10 nm) that tightly confine electrons, electron holes, or excitons with respect to all direction of a three dimensional space to have discrete energy levels. A peak wavelength of emitting light (a color of emitting light) is freely selectable by changing the dot size.

In the present embodiment, the barrier layer of the phosphor sheet 41 is a metal oxide film made of aluminum or silicon oxide. The barrier layer protects the quantum dot phosphors included in the wavelength conversion layer from coming into contact with moisture (humidity) or oxygen. The barrier layer is formed on the support layer with the vacuum deposition method, for example.

In the present embodiment, the reflection sheet 42 is disposed on top of the phosphor sheet 41 on a front side thereof (on an opposite side from the LEDs 51 with respect to the phosphor sheet 41). The reflection sheet 42 is preferably disposed to be in contact with the secondary light exit surface 41B of the phosphor sheet 41 and cover the secondary light exit surface 41B. The reflection sheet 42 is preferably disposed to have substantially no space with respect to the phosphor sheet 41. The reflection sheet 42 has a first surface 42A on the front side (on an opposite side from the phosphor sheet 41, opposite the diffuser sheet 43) and has a function of reflecting light that has reached the first surface 42A (refer FIGS. 2 and 3). The material of the reflection sheet 42 is not limited as long as the reflection sheet 42 has such a function. A known light reflecting member of a sheet or a plate such as a metal thin film sheet, an inductor multilayer film sheet, or a sheet having good light reflectivity and made of white foamed polyethylene terephthalate (one example of a white plastic sheet) may be used as the reflection sheet 42.

The reflection sheet 42 includes a light transmission section in a portion thereof. The light that has reached the second surface 42B, which is a back surface (on the phosphor sheet 41 side or the LED 51 side), of the reflection sheet 42 passes through the light transmission section at a higher ratio than other sections toward the first surface 42A. In this embodiment, the reflection sheet 42 includes through holes 42H (one example of the light transmission section) therein as the light transmission section. The reflection sheet 42 includes a non-transmission section 42N where no through holes 425 are formed. Light does not substantially pass through and is reflected by the non-transmission section 42N. The non-transmission section 42N is preferably configured to reflect 90% or more of the light rays that have reached the first surface 42A, and more preferably 95% or more, and much more preferably 98% or more. The light transmission section such as the through hole 42H is preferably configured to transmit 90% or more of the light rays that have reached the second surface 42B, and more preferably 95% or more, and much more preferably 98% or more.

In this embodiment, the through hole 42H is formed to overlap the light emitting surface 51A of the LED 51 with a view in a normal line of the first surface 42A (the front-back direction). The LEDs 51 in this embodiment are arranged in rows and columns on the mounting surface 22A of the LED board 22, as described earlier. The through holes 42H are formed in rows and columns corresponding to the respective LEDs 51. The LEDs 51 in this embodiment are arranged in such a manner that the optical axis of each LED 51 matches the normal direction of the plate surface of the optical member 40 including the reflection sheet 42, as described earlier. Therefore, an incident angle of the light rays that have been emitted by the LED 51 and reached the second surface 42B of the reflection sheet 42 is smallest in the section that overlaps the light emitting surface 51A of the LED 51 with a view in the normal direction of the first surface 42A (the front-back direction). The through hole 42H is formed in an area including the above section. To increase evenness of the light rays exiting the backlight unit 20, the through hole 42H may be formed in other sections in addition to the section that overlaps the light emitting surface 51A of the LED 51 with a view in the normal direction of the first surface 42A (the front-back direction).

The through holes 42H each of which is a single unit and has a predefined shape are included repeatedly in a planar form. A unit shape of the through hole 42H may be any shape defined by a curved line such as a circle, an oval, and a cloud shape, or a polygon defined by straight lines such a triangle and a square, or combination thereof. The unit shapes of all the through holes 42H may be same but may be different in shape and size according to the position on the reflection sheet 42 (so as to be in gradation, for example). The through holes 42H may be formed in a continuous form, for example, in a mesh connecting the sections above the respective LEDs 51. The shape of the through hole 42H depends on an outline of the LED 51 but is not necessarily the same as that of the LED 51. For example, the present embodiment includes mini LEDs that have a very small outline as the LEDs 51. As illustrated in FIG. 1, each LED 51 has a cubic shape and the light emitting surface 51A has a square plan view shape and the through holes 42H that are formed directly above the respective LEDs 51 have a circular shape and a same size as that of the LED such that the whole light emitting surface 51A overlaps the through hole 42H in a plan view.

The method of forming the through holes 42H is not particularly limited but may be any method. For example, after the reflection sheet without having holes is formed, the portions where the through holes are to be formed are removed with punching or photo-process. The reflection sheet 42 including the through holes 42H may be formed with using a screen.

Travelling of the light in the backlight unit 20 having the above configuration will be described. As illustrated in FIG. 3, the primary blue light that is emitted by the LED 51 through a top surface thereof toward the front side (in the exit direction L1 of the primary light) enters the phosphor sheet 41 through the primary light entering surface 41A. While the light passes through the phosphor sheet 41, some of the light rays are converted to green secondary light and red secondary light through the wavelength conversion by the quantum dot phosphors and another of the primary light rays that are not converted through the wavelength conversion pass through the phosphor sheet 41 as the blue light. As a result, the blue light, the green light, and the red light are mixed and substantially white secondary light is obtained. The white secondary light exits the phosphor sheet 41 through the front side secondary light exit surface 41B.

The secondary light that has exited the phosphor sheet 41 through the secondary light exit surface 41B reaches the second surface 42B, which is a back surface, of the reflection sheet 42 that is disposed on top of the phosphor sheet 41. Some of the light rays that have reached the section of the second surface 42B having the through hole 42H only pass through the through hole 42H to the first surface 42A side at a high rate. The light rays that have exited the reflection sheet 42 to the first surface 42A side reach the diffuser sheet 43 disposed on the front side. The light rays pass through the diffuser sheet 43 while being diffused and reach the brightness enhancement sheet 44 disposed on the front side. The light rays further pass through the brightness enhancement sheet 44 and exit through the light exit surface 20A toward the liquid crystal panel 10.

In such a process, for example, some of the light rays may be reflected by an interface between the diffuser sheet 43 and the brightness enhancement sheet 44. The reflected light rays reach the first surface 42A and try to enter the reflection sheet 42 but are reflected by the non-transmission section 42N of the first surface 42A. The reflected light rays do not pass through the phosphor sheet 41 that is disposed on the back surface side of the reflection sheet 42 and change the traveling direction thereof to travel toward the front side (the diffuser sheet 43) again. Then, the light rays pass through the diffuser sheet 43 and the brightness enhancement sheet 44 sequentially and exit through the light exit surface 20A toward the liquid crystal panel 10. During the procedure, if the light rays are reflected by the interface between the diffuser sheet 43 and the brightness enhancement sheet 44 again, most of the reflected light rays are reflected by the non-transmission section 42N of the first surface 42A of the reflection sheet 42 and such travelling procedures are performed repeatedly. Thus, most of the reflected light rays exit through the light exit surface 20A without passing through the phosphor sheet 41. Therefore, the number of times most of the secondary light rays that have exited the reflection sheet 42 to the first surface 42A side once pass through the phosphor sheet 41 before exiting through the light exit surface 20A is much smaller than the number of times obtained in a prior art backlight unit without including the reflection sheet 42. As a result, color unevenness caused by the multi-wavelength conversion is suppressed in the light rays exiting through the light exit surface 20A.

Figure 4A:
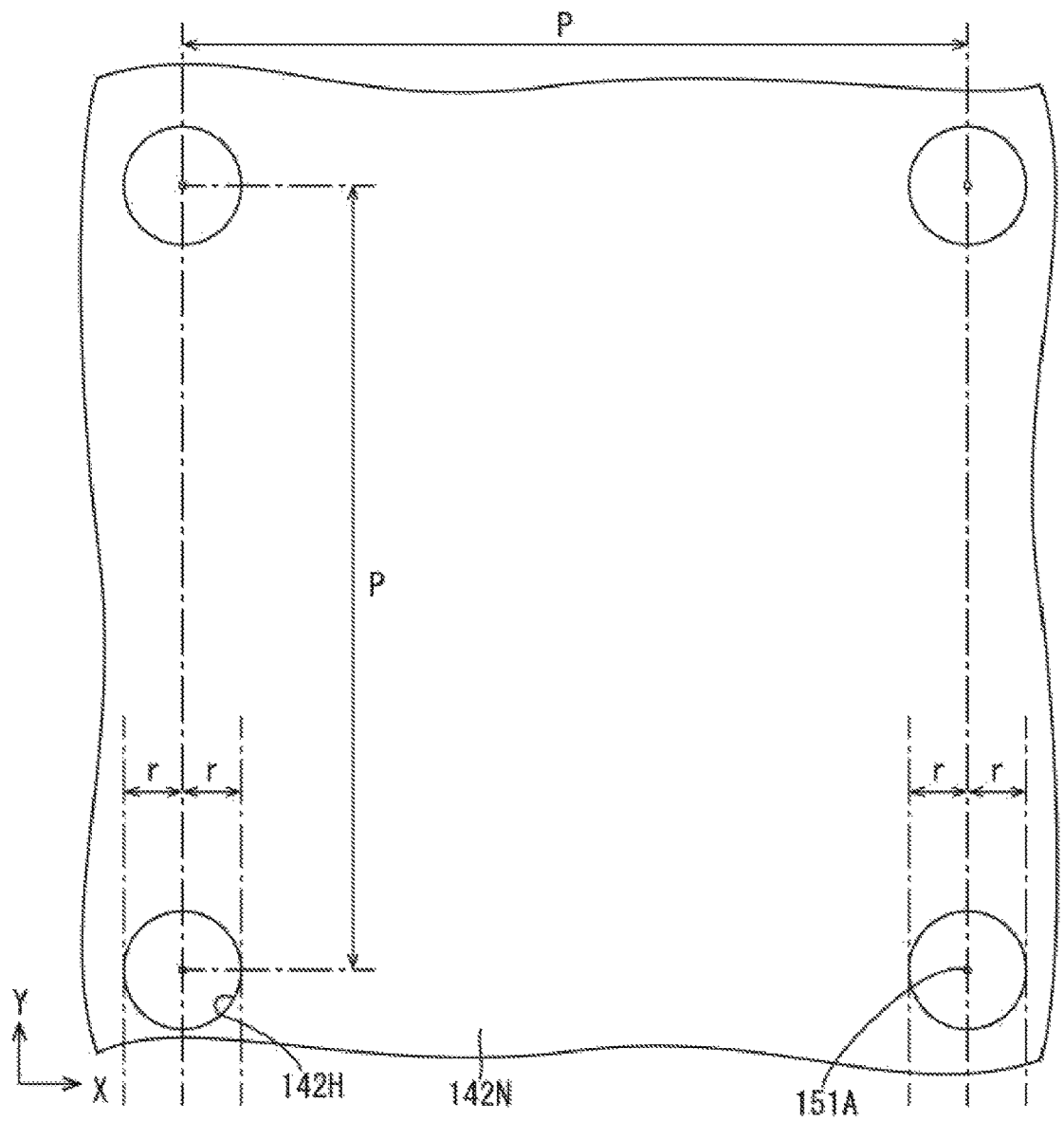
FIG. 4A is a plan view schematically illustrating a configuration of a light source unit model.
Figure 4B:
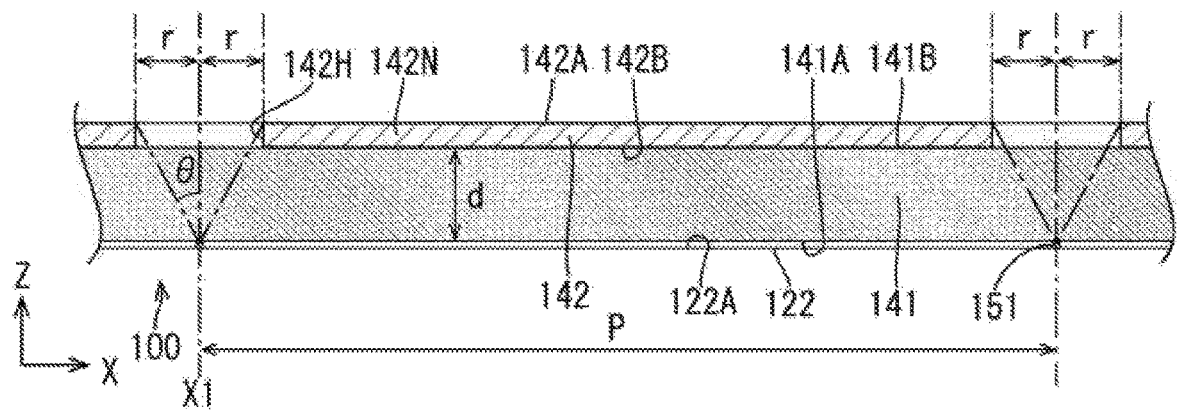
FIG. 4B is a cross-sectional view schematically illustrating a configuration of the light source unit model.

Influences of the layout of the through holes 42H in the reflection sheet 42 acting on the brightness (light use efficiency) of the backlight unit 20 will be explained with reference to a virtual light source unit model 100 having a similar basic configuration. FIGS. 4A and 4B schematically illustrate the configuration of the light source unit model 100.

As illustrated in FIGS. 4A and 4B, the light source unit model 100 includes a light source board 122, a top-surface light-emitting type light source 151 that is mounted on the light source board 122 and emits the primary light, a wavelength conversion sheet 141 disposed to be in contact with a light emitting surface 151A of the light source 151 without having a space therebetween, and a reflection layer 142 that is disposed to be in contact with the wavelength conversion sheet 141 without having a space therebetween. The mounting surface of the light source board 122, a primary light entering surface 141A and a secondary light exit surface 141B of the wavelength conversion sheet 141, a second surface and a first surface 142A of the reflection layer 142 are parallel to each other and the normal directions of the surfaces match each other. The primary light entering surface 141A is opposite the light source 151 and the secondary light exit surface 141B is on an opposite side from the light source 151. The second surface is opposite the wavelength conversion sheet 141 and the first surface 142A an opposite side from the wavelength conversion sheet 141. A liquid crystal panel is disposed on the first surface 142A side of the reflection layer 142 via an optical member, and light exits the light source unit model 100 toward the liquid crystal panel.

In the light source unit model 100, it is supposed that the light source 151 mounted on the light source board 122 is a minute surface light source and has a uniform distribution (an index indicating direction of the light from the light source and intensity (luminous intensity) of the light) in which the light spreads uniformly, and the uniform distribution is a so-called Lambertian distribution. As illustrated in FIG. 4B, the wavelength conversion sheet 141 has a thickness d and the light sources 151 are arranged at an arrangement interval P, and the thickness of the reflection layer 142 has no influence. The reflection layer 142 includes light transmission sections 142H. The light transmission section 142H is formed in a section of the first surface 142A that is defined as follows. A normal line of the first surface 142A that passes a center of the light source 151 (an optical axis of the light source 151 with respect to the reflection layer 142) is defined as an axis X1 and an angle between the axis X1 and a line extending from the light source 151 to the first surface 142A is θ or smaller. Namely, some of the secondary light rays that are emitted by the light source 151 and converted through the wavelength conversion sheet 141 and exit the sheet at the angle θ or smaller with respect to the axis X1 are supplied to the light transmission section 142H. Hereinafter, a radius of the light transmission section 142H may be represented by r (r=d×tan θ). It is supposed that 100% of the light rays that have reached the non-transmission section 142N except for the light transmission sections 142H are reflected by the first surface 142A and the second surface 142B of the reflection layer 142 and 100% of the light rays that have reached the light transmission sections 142H pass therethrough.

Based on the above condition, the illuminance of the primary light emitted by the light source 151 on the axis X1 (namely, θ=0°) is represented by $E_0$, and the illuminance of the light on a circumference of a circle that is obtained by forming an angle θ with respect to the axis X1 is represented by $E_\theta$, and the following formula (1) is obtained based on the cosine fourth law. It is obvious from the formula (1) that the illuminance of the primary light that is emitted by the light source 151 and supplied to the wavelength conversion sheet 141 is a half or more at the position of θ=30° and a ¼ at the position of θ=45° with reference to the position of θ=0°.

$$E_\theta = E_0 \times \cos^4 \delta \qquad (1)$$

On the other hand, the reflection efficiency on the first surface 142A of the reflection layer 142 depends on an area ratio of the light transmission sections 142H to the non-transmission section 142N of the reflection layer 142. An area A of the light transmission section 142H within a unit area is obtained by the following formula (2).

$$\begin{aligned} A &= \Pi \times r^2 \\ &= \Pi \times (d \times \tan\theta)^2 \\ &= \Pi \times d^2 \times \tan^2\theta \end{aligned} \qquad (2)$$

Based on the formula (2), when the angle θ becomes greater, an increase dA/dθ of the area A of the light transmission section 142H is obtained by the following formula (3). In the formula (3), the value of ($\sin \theta/\cos^3 \theta$) abruptly increases as the angle θ increases within the range of 0°≤θ≤90° (($\sin \theta/\cos^3 \theta$)≈2, when θ=45°, and ($\sin \theta/\cos^3 \theta$)≈7, when θ=60°). Therefore, it is obvious that the reflection area (the area of the non-transmission section 142N) on the first surface 142A decreases as the angle θ increases, and among the light rays that have reached the first surface 142A from an outside (on an opposite side from the light sources 151) of the reflection layer 142, the ratio of the light rays that are reflected by the first surface 142A and exit the light source unit model 100 to be used is decreased.

$$dA(\theta)/d\theta = 2\pi \times d^2 \times (\sin \theta/\cos^3 \theta) \qquad (3)$$

When the luminous intensity of light that is emitted by the light source 151 evenly in each direction is represented by $I_0$, the illuminance $E_0$ at the position of θ=0° is obtained by the following formula (4).

$$E_0 = I_0/d^2 \qquad (4)$$

Based on the above formulae (1) and (4), the following formula (5) is obtained.

$$E_\theta = I_0 \times \cos^4 \theta/d^2 \qquad (5)$$

To simplify the calculation, the diffusing properties and the wavelength conversion efficiency of the wavelength conversion sheet 141 are not taken into consideration and it is supposed that the light transmittance of the wavelength conversion sheet 141 is 100%. The luminous flux $\Phi\theta$ that passes through the light transmission section 142H of the reflection layer 142 is obtained by integrating the illuminance by the area of the light transmission section 142H as indicated by Formula. 1 and the following formula (6) is obtained.

[Formula 1]

$$\Phi\theta = \int_0^\theta \{E_0 \times \cos^4\theta \times 2\pi r/\cos\theta\}d\theta \quad (6)$$

$$= 2 \times \pi \times E_0 \times d \times \int_0^\theta \{\cos^3\theta \times \tan\theta\}d\theta$$

$$= (\pi/2) \times E_0 \times d \times (1 - \cos^3\theta)$$

$$= (\pi/2) \times I_0 \times (1 - \cos^3\theta)/d$$

Hereinafter, the light use efficiency will be considered for a unit area including one light source 151 and one light transmission section 142H in a plan view of the light source unit model 100. Regarding the reflection from an optical member (for example, the diffuser sheet 43 and the brightness enhancement sheet 44 in the first embodiment) that is disposed on a front side (on the light exit side, on the liquid crystal panel side) of the reflection, it is supposed that s % of the light rays that have passed through the light transmission section 142H is reflected and α % thereof is lost, that is, (100−s−α) % of the light rays exits toward the liquid crystal panel per one incident of light. Among the s % light rays that have been reflected by the optical member and reached the first surface 142A of the reflection layer 142, the ratio of the light rays that are reflected by the first surface 142A again depends on a ratio of the light transmission section 142H and the non-transmission section 142N in a unit area of the reflection layer 142. Therefore, the ratio of light rays that are reflected again to the light rays that have passed through the light transmission section 142H is obtained by (s/100)×(P²−πr²)/P². The light rays that are reflected again are supplied to the optical member on the front side of the reflection layer 142. Some of the light rays that have reflected again are reflected further again similarly to the light rays that have passed through the light transmission section 142H first time and travel toward the first surface 142A of the reflection layer 142 again. The ratio of the light rays that are reflected further again toward the first surface 142A of the reflection layer 142 is obtained by (s/100)×(P²−πr²)/P²×(s/100). Such reflections will be repeated (multi-reflection).

When the luminous flux that passes through the light transmission section 142H is represented by $\Phi\theta$, the luminous flux $\Phi f$ that passes through and exits the optical member toward the liquid crystal panel is represented by the following formula (7) with considering the above-described multi-reflection sum of geometric progression).

$$\Phi f = \Phi\theta \times a/(1-b) \quad (7)$$

In the formula (7), a represents light transmittance (%) of light that passes through the optical member at one incident, and b represents a re-entering ratio (%) of light that re-enters the optical member that is obtained by multiplying the reflectance of the optical member and the reflectance of the reflection layer 142. a and b are represented as follows.

$$a = (100 - s - \alpha)/100$$

$$b = s/100 \times (P^2 - \pi r^2)/P^2$$

$$= s/100 \times \left(1 - \Pi \times (d/P)^2 \times \tan^2\theta\right)$$

When s'=s/100 and α'=α/100, the above a and b are represented as follows.

$$a = 1 - s' - \alpha'$$

$$b = s' \times (1 - \pi \times (d/P)^2 \times \tan^2\theta)$$

When a and b, and the formula (6) are substituted for the formula (7), the following formula (8) is obtained.

$$\Phi f = \Phi\theta \times a/(1-b) \quad (7)$$

$$= (\pi/2) \times I_0 \times (1 - \cos^3\theta)/d \times a/(1-b) \quad (8)$$

$$= \{(\pi/2) \times I_0 \times (1 - \cos^3\theta) \times (1 - s' - \alpha')\}/$$

$$\{(1 - s' \times 1 - \Pi \times (d/P)^2 \times \tan^2\theta)) \times d\}$$

$$= \{(\pi/2) \times I_0 \times (1 - \cos^3\theta) \times (1 - s' - \alpha')\}/$$

$$\{(d \times (1 - s' \times (1 - \Pi \times (d/P)^2 \times \tan^2\theta))\}$$

Figure 5:
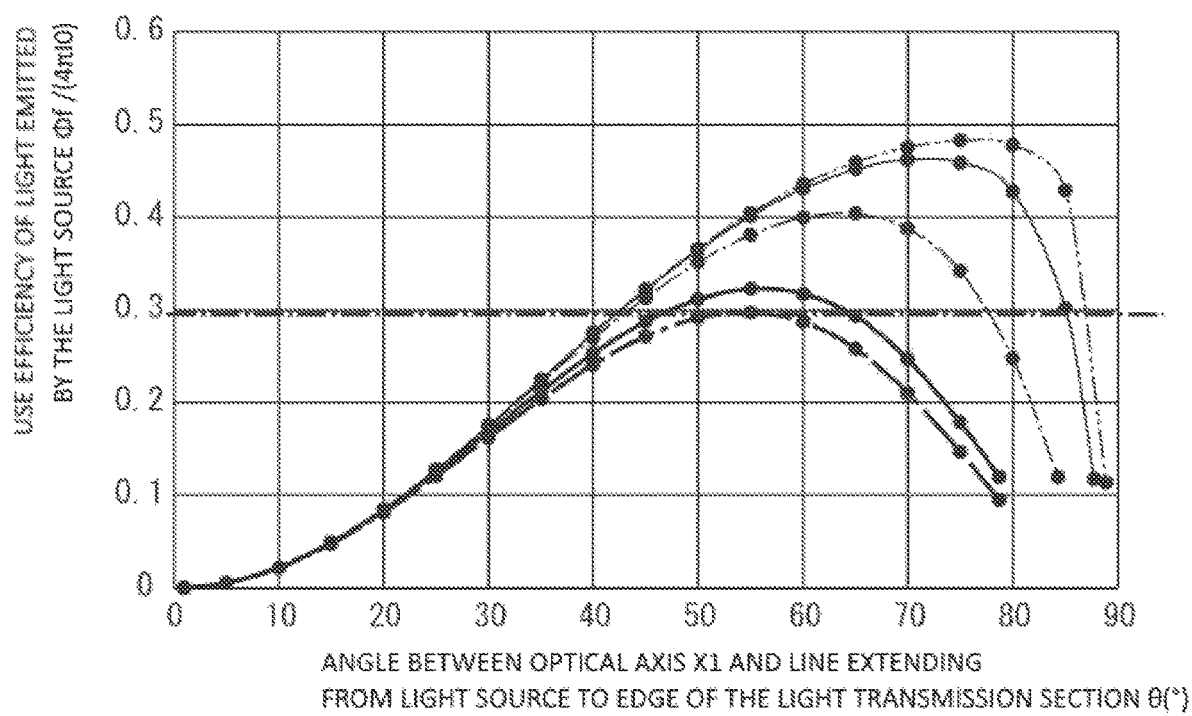
FIG. 5 is graphs representing relations between an angle between an optical axis and a line extending from a LED to an edge of a light transmission section (θ) and use efficiency of light emitted by the LED represented by ($\Phi f/4\pi I_0$) with various arrangement intervals of the LEDs.

FIG. 3 illustrates graphs representing relations between the angles θ in the light transmission section 142H and the values of $\Phi f/(4\pi I_0)$ obtained when d=200 μm, s'=0.5, α'=0.1 and the arrangement interval P of the light sources 151 is varied between 0.9 mm, 1 mm, 2 mm, 5 mm, and 10 mm. The luminous intensity $I_0$ represents luminous flux that exits in a certain direction and the luminous flux that is emitted by the light source 151 is calculated by multiplying the luminous intensity $I_0$ by a solid angle. It is supposed trial the light source 151 basically emits light in all directions. Since the solid angle is 4π, the luminous flux that is emitted by the light source 151 is represented by $4\pi I_0$. $\Phi f/(4\pi I_0)$ is a value that is obtained by dividing the luminous flux $\Phi f$ that passes through the optical member and exits toward the liquid crystal panel by the luminous flux ($4\pi I_0$) that is emitted by the light source 151 in all directions and represents use efficiency of the light that is emitted by the light source 151. If the value of $\Phi f/(4\pi I_0)$ is low, it is necessary to increase the number of light sources 151 to reduce the arrangement interval between the light sources 151. However, if the arrangement interval becomes smaller, the heat generated by the light source 151 needs to be dissipated, but otherwise the light emission efficiency of the light source 151 may be lowered. Therefore, to effectively use the light from the light source 151 in the lighting device that is mounted in an image display device, for example, the value of $\Phi f/(4\pi I_0)$ is preferably 0.3 or more. With reference to FIG. 5, if the arrangement interval P between the light sources 151 is 0.9 mm or less, it may be difficult to obtain 0.3 or more for the value of $\Phi f/(4\pi I_0)$. Therefore, the arrangement interval is preferably 1 mm or more. With reference to FIG. 5, the angle θ that defines the light transmission section 142H is preferably from 40° or greater to 90° or less, more preferably from 45° or greater to 80° or less, and particularly preferably from 50° or greater to 60° or less. The preferable angle θ is changed depending on the arrangement interval P. Therefore, more particularly, when the arrangement interval is about 10 mm, the angle θ is preferably from 40° or greater to 90° or less, more preferably from 55° greater to 85° or less, and particularly preferably from 70° or greater to 80° or less. When the arrangement interval P is about 5 mm, the angle θ is preferably from 40° or greater to 85° or less, more preferably from 55° or greater to 85° or less, and particularly preferably from 65° or greater to 75° or less. When the arrangement interval P is about 2 mm, the angle θ is preferably from 42° or greater to 78° or less, and more preferably from 60° or greater to 70° or less. When the arrangement interval P is about 1 mm, the angle θ is preferably from 47° or greater to 65° or less. Within such a range, the value of $\Phi f/(4\pi I_0)$ can be 0.3 or more and the light use efficiency can be increased.

Figure 6:
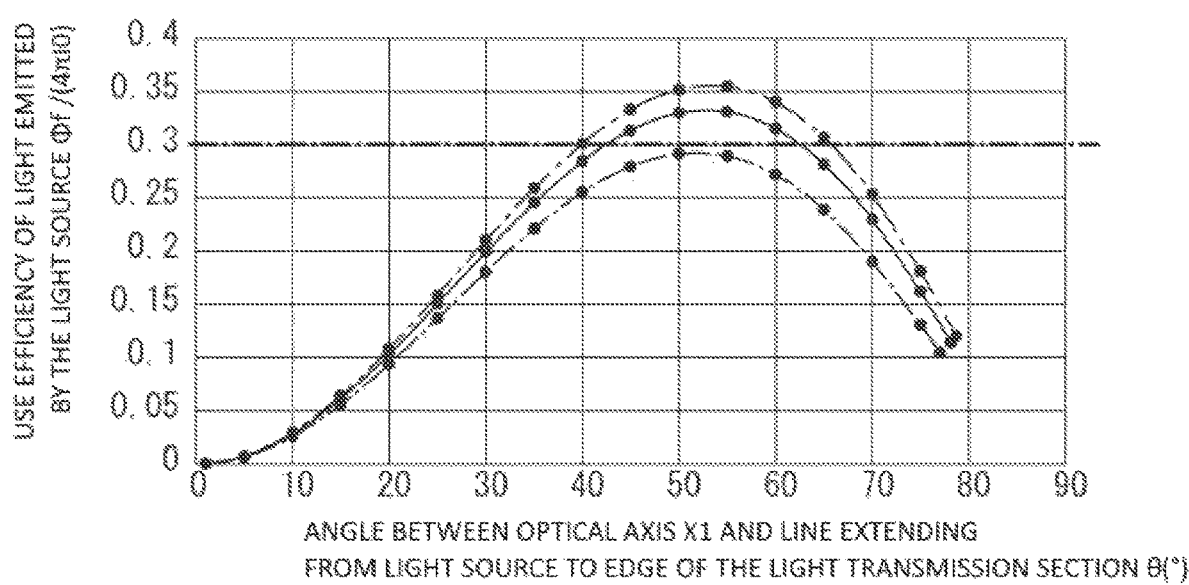
FIG. 6 is graphs representing relations between the angle between the optical axis and the line extending from the LED to the edge of the light transmission section (θ) and the use efficiency of light emitted by the LED represented by ($\Phi f/4\pi I_0$) with various thicknesses of a wavelength conversion sheet.

FIG. 6 illustrates graphs representing relations between the angles θ in the light transmission section 142H and the values of $\Phi f/(4\pi I_0)$ obtained when P=1 mm, s'=0.5, α'=0.1 and the thickness d of the wavelength conversion sheet 141 is varied between 200 μm, 2.10 μm, and 230μm. As illustrated in FIG. 6, the light use efficiency is varied depending on the thickness d. As the thickness d increases from 200 μm, the use efficiency of the light with respect to $I_0$ of the light source 151 is lowered. If the thickness d is 230 μm or more, it may be difficult to obtain 0.3 or more for the value of $\Phi f/(4\pi I_0)$ and to achieve brightness that is necessary for the lighting unit mounted in the image display device. Therefore, it is assumed that the thickness d of the wavelength conversion sheet 141 is preferably less than 230 μm, more preferably 210 μm or less, and particularly preferably 200 μm or less. The preferable angle θ is different depending on the thickness d. When the thickness d is about 210 μm, the angle θ is preferably from 40° or greater to 65° or less and more preferably from 45° or greater to 60° or less. When the thickness d is about 200 μm, the angle θ is preferably prom 40° or greater to 65° or less and more preferably from 45° or greater to 60° or less. Within such a range, the value of $\Phi f/(4\pi I_0)$ can be 0.3 or more and the light use efficiency can be further increased.

(1) As described above, the backlight unit 20 (the lighting unit) according to the first embodiment includes the LEDs 51 (the light source) that emits primary light (blue light) included in a certain wavelength range, the phosphor sheet 41 (the wavelength conversion member) that is disposed on a light emitting direction side of the primary light with respect to the LEDs 51, and the reflection sheet 42 (the reflection layer) that is disposed on an opposite side from the LEDs 51 with respect to the phosphor sheet 41. The phosphor sheet 41 has a function of converting some of the first primary light rays that have passed through the phosphor sheet 41 into secondary light rays (green light or red light) included in another wavelength region that is different from the certain wavelength region. The reflection sheet 42 has a function of reflecting light that reaches the first surface 42A on an opposite side from the LEDs 51. The reflection sheet 42 includes through holes 42H (the light transmission section) and the light that reaches the second surface 42B on a LED 51 side passes through the through hole 42H at a higher rate than other sections.

In the backlight unit 20 having the above configuration, the primary light (blue light) that is emitted by the LEDs 51 reaches the primary light entering surface 41A on the LED 51 side (back surface side) of the phosphor sheet 41 and enters the phosphor sheet 41 through the primary light entering surface 41A. Some of the primary light rays are converted into secondary light (green light or red light) with wavelength conversion while the primary light rays passing through the phosphor sheet 41. Then, the converted light rays exit the phosphor sheet 41 through the secondary light exit surface 41B on an opposite side from the LEDs 51 (the front side). The secondary light rays that have exited the phosphor sheet 41 and reached the second surface 42B of the reflection sheet 42 pass through the through holes 42H, which are formed in portions of the reflection sheet 42, and exit the reflection sheet 42 through the first surface 42A. On the other hand, the reflection sheet 42 that is disposed on an opposite side from the LEDs 51 with respect to the phosphor sheet 41, that is, on the secondary light exit surface 41B side reflects the light that has reached the non-transmission section 42N of the first surface 42A. Therefore, most of the light rays that are to travel toward the phosphor sheet 41 from an outside of the first surface 42A of the reflection sheet 42 are blocked by the reflection sheet 42. Accordingly, among the light rays that have passed the phosphor sheet 41 once and exited the reflection sheet 42 through the first surface 42A, the amount of the light rays that enter the phosphor sheet 41 through the secondary light exit surface 41B again is much smaller than that in a configuration without including the reflection sheet 42. The light rays that have reflected by the first surface 42A of the reflection sheet 42 do not pass through the phosphor sheet 41 and multi-reflected repeatedly by the reflection sheet 42 and the optical member 40 that is disposed on the front side (on the opposite side from the LEDs 15) of the reflection sheet 42. Thereafter, most of the reflected light rays exit the backlight unit 20. According to the above configuration, the amount of light rays that are multi-reflected in the backlight unit 20 is reduced and the number of times the light passes through the phosphor sheet 41 is greatly reduced until the light emitted by the LEDs 51 exits the backlight unit 20. As a result, color unevenness caused by the light rays that are multi-reflected and converted with multiple wavelength conversion is effectively suppressed in the backlight unit 20. The reflection sheet 42 preferably reflects 90% or more of the light rays that have reached the non-transmission section 42N except for the through holes 42H in the first embodiment. Further, the reflection sheet 42 more preferably reflects 95% or more of the light rays, and much more preferably 98% or more of the light rays. The light transmission sections such as the through holes 42H preferably transmits 90% or more of the light rays that have reached the second surface 42B, more preferably 95% or more, and much more preferably 98% or more.

(2) In the backlight unit 20 according to the first embodiment, the reflection sheet 42 disposed adjacent to the phosphor sheet 41, which means no other components are between the reflection sheet 42 and the phosphor sheet 41. The reflection sheet 42 and the phosphor sheet 41 may be disposed to have a space therebetween; however, the two sheets are preferably disposed adjacent to each other without having a space therebetween. According to such a configuration, the reflection sheet 42 that is disposed quite close to the secondary light exit surface 41B of the phosphor sheet 41 reflects light. This surely reduces the amount of light rays that reach the secondary light exit surface 41B and the wavelength conversion amount of the light that may be increased by the multi-wavelength conversion. As a result, color unevenness in the backlight unit is suppressed more effectively. The reflection sheet 42 is preferably disposed to cover the secondary light exit surface 41B of the phosphor sheet 41. According to such a configuration, most of the light rays that try to enter the phosphor sheet 41 through the secondary light exit surface 41B again are blocked by the reflection sheet 42 and the amount of light rays that are to be multi-reflected is decreased. As a result, occurrence of color unevenness is effectively suppressed in the backlight unit 20. As the distance between the reflection sheet 42 and the phosphor sheet 41 becomes smaller, it is more preferable.

Furthermore, it is particularly preferable that the reflection sheet 42 is disposed on top of the phosphor sheet 41 to be in contact with the secondary light exit surface 41B or the reflection sheet 42 is formed on the secondary light exit surface 41B of the phosphor sheet 41. According to such a configuration, occurrence of the color unevenness is effectively suppressed and also the light use efficiency of the light emitted by the LEDs 51 is improved and the backlight unit 20 can be reduced in thickness and size (frame width).

(3) In the backlight unit 20 according to the first embodiment, the phosphor sheet 41 is disposed adjacent to the LEDs 51. Normally, in the lighting unit, the light emitted by the light source passes through optical members providing various kinds of optical effects such as uniform diffusion or brightness enhancement and subsequently exits the lighting unit. According to the above-described configuration, the primary light emitted by the LED 51, which is the light source, enters the phosphor sheet 41 first and converted into secondary light with the wavelength conversion. Then, the converted light passes through the optical member 40 except for the phosphor sheet 41. Accordingly, the optical effects similar to those in the prior art can be provided to the light exiting the backlight unit 20 while suppressing the multi-wavelength conversion. The distance between the phosphor sheet 41 and the LEDs 51 is more preferable as it is smaller. Furthermore, the phosphor sheet 41 is preferably disposed on the LEDs 51 while having substantially no space therebetween. According to such a configuration, the light use efficiency of the light emitted by the LEDs 51 is increased and the backlight unit 20 can be reduced in thickness and size (frame width).

(4) In the backlight unit 20 according to the first embodiment, the through hole 42H included in a section of the reflection sheet 42 is the light transmission section. According to such a configuration, with a simple configuration including the through hole 42H in the reflection sheet 42, the amount of light rays that enter the phosphor sheet 41 through the secondary light exit surface 41B can be reduced and some of the light rays emitted by the LED 51 pass through the reflection sheet 42 from the second surface 42B side to the first surface 42A side. Thus, the light exit amount of the light rays exiting the backlight unit 20 can be maintained.

(5) In the backlight unit 20 according to the first embodiment, the through hole 42H is formed in the reflection sheet 42 so as to include an area overlapping the LED 51 seen from the normal direction of the first surface 42A. The light emitted the LED 51 and reaches the reflection sheet 42 and exits toward the first surface 42A normally has a higher density of the luminous flux and the incident angle is small at a position overlapping the LED 51 seen from the normal direction of the first surface 42A. Therefore, the light exiting toward the first surface 42A is not reflected at each interface and a higher ratio of the light rays exit toward the first surface 42A. According to the above configuration, by providing the through hole 42H to include such section, the re-entry of the light from the secondary light exit surface 41B side to the phosphor sheet 41 is suppressed and the amount of light rays exiting the reflection sheet 42 through the first surface 42A can be ensured. This increases a light exit ratio from the backlight unit 20 and increases light use efficiency and the backlight unit 20 that can suppress color unevenness and exert high brightness can be provided.

(6) In the backlight unit 20 according to the first embodiment, the through hole 42H is formed in the reflection sheet 42 so as to include a position where the light emitted by one LED 51 reaches the second surface 42B at the smallest incident angle. The light emitted by the LED 51 and reaches the reflection sheet 42 normally has a high density of the luminous flux and the incident angle is small at the position where the light reaches the second surface 42B at the smallest incident angle. Therefore, the light reaching the reflection sheet 42 is not reflected at each interface and a higher ratio of the light rays exit toward the first surface 42A. According to the above configuration, by providing the through hole 42H to include such a section, the re-entry of the light from the secondary light exit surface 41B side to the phosphor sheet 41 is suppressed and the amount of light rays exiting the reflection sheet 42 through the first surface 42A can be ensured. This increases a light exit ratio from the backlight unit 20, that is light use efficiency, and the backlight unit 20 that can suppress color unevenness and exert high brightness can be provided.

(7) In the backlight unit 20 according to the first embodiment, the LEDs 51 are mounted on the LED board 22 (the light source board) and the mounting surface 22A of the LED board 22 where the LEDs 51 are mounted is a low reflection surface that causes less light reflection. The mounting surface of the light source board where the light source is mounted has been generally a high reflection surface that accelerates light reflection to diffuse light and increase light use efficiency. However, if the light is reflected by the mounting surface of the light source board, the light is likely to be multi-reflected by the reflection layer and the mounting surface of the light source board and the light is converted with multi-wavelength conversion and this may cause color unevenness. According to the above configuration, since the mounting surface 22A of the LED board 22 is a low reflection surface, the amount of light rays that have reached the mounting surface 22A and is reflected toward the phosphor sheet 41 is reduced and this reduces multi-reflection of the light and multi-wavelength conversion. As a result, color unevenness is less likely to be caused in the backlight unit 20. The low reflection surface may be a surface that is formed to reduce the amount of the reflected light rays compared to the mounting surface of a general light source board. For example, preferably 20% or less of the light rays that are supplied to the low reflection surface reflected, 10% or less is more preferable, and 5% or less is particularly preferable. The low reflection surface is formed as follows, for example. A target surface is coated with a low reflection resin layer including a light absorber or a target surface is processed with a surface roughing treatment.

(8) In the backlight unit 20 according to the first embodiment, the LEDs 51 (light emitting diodes) are included as the light source. The LEDs (light emitting diodes) that have high light emission efficiency and small power consumption have been widely used as a light source in a lighting unit. Since the LEDs have high directivity of light, the configurations described in (1) to (7) are particularly effective for reducing color unevenness in the backlight unit 20 including the LEDs 51 as the light source. Particularly, a local-dimming type lighting unit in which a light exit area is divided into multiple sections and each section driven separately and having a following configuration has been greatly expected. Like the backlight unit 20 according to the present embodiment, the mini LEDs 51 having a cubic outer shape of 0.3 mm or less and emitting primary light are used as the light source and the primary light is converted with wavelength conversion into white secondary light and the backlight unit exits white light. When the light emission brightness is varied in each light source or each section like in the local dimming control, color of the chromaticity of display is shifted for every pixel depending on the distance between the surrounding of the pixel from the light source. The present technology is particularly useful for the lighting unit having such a configuration.

(9) The backlight unit 20 according to the first embodiment includes multiple LEDs 51. To suppress color unevenness in the backlight unit 20 including the LEDs 51 like the local dimming type lighting unit described above, the configurations of (1) to (8) are particularly useful.

(10) The liquid crystal display device 1 (the display device) according to the first embodiment includes the liquid crystal panel 10 (the display panel) having the image display surface 10A displaying an image, and the backlight unit 20 described in (1) to (9). According to such a configuration, the liquid crystal display device 1 having less occurrence of color unevenness and good image display quality can be obtained.

(11) In the liquid crystal display device 1 according to the first embodiment, the LEDs 51 are disposed directly below the image display surface 10A. According to such a configuration, the liquid crystal display device 1 including the direct type backlight unit 20 and having good image display quality can be obtained. Such a liquid crystal display device 1 can be particularly and preferably used in performing the local dimming control.

Second Embodiment

A second embodiment will described with reference to FIGS. 7A and 7B. The present embodiment differs from the backlight unit 20 according to the first embodiment in that LEDs 251 with a chip scale package (CSP) are used as a light source of a backlight unit 220. Other basic configurations of the backlight unit 220 are similar to those of the backlight unit 20 in the first embodiment. Hereinafter, the configurations same as those in the first embodiment are provided with the same symbols and will not be described (similar in a third embodiment).

Figure 7A:
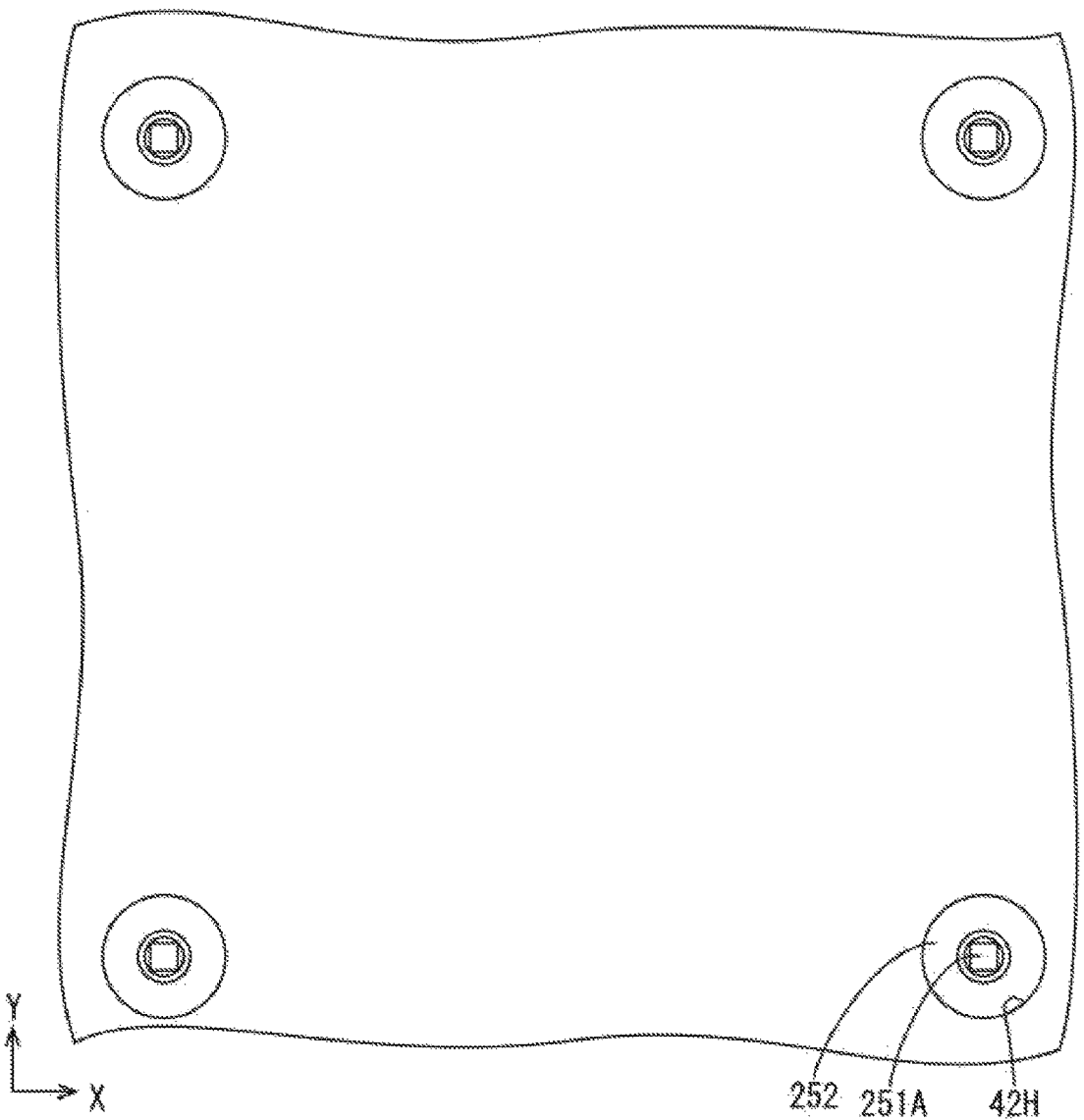
FIG. 7A is a plan view schematically illustrating an layout of a reflection sheet and LED packages in a liquid crystal display device according to a second embodiment.
Figure 7B:
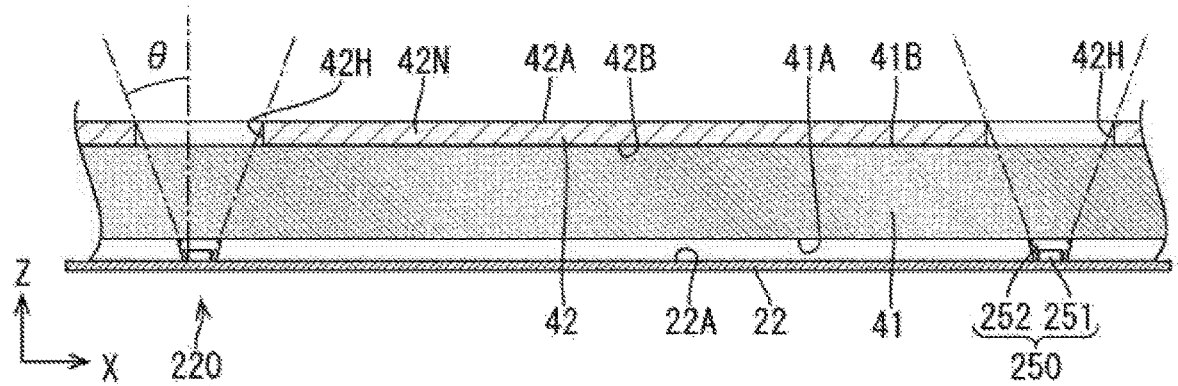
FIG. 7B is a cross-sectional view schematically illustrating the layout of the reflection sheet and the LED packages.

As illustrated in FIGS. 7A and 7B, the LED 251 in the present embodiment is installed in a package 250 that has an outer shape of a truncated cone. A diameter of the package 250 increases as the package 250 extends to the front side. The package 250 has a side surface and a bottom surface (a back surface, a surface that is mounted on the LED board 22) that provide an outline thereof. At least inner surfaces of the side surface and the bottom surface are configured with a reflecting member 252 having good light reflectivity. In the present embodiment, the package 250 is open at a top surface (a front surface, a surface that is opposite the primary light entering surface 41A of the phosphor sheet 41) and the inside of the package 250 is a hollow space. The hollow space of the package 250 may be filled with a material having light transmissivity and a refractive index that is uniform and greater than the refractive index of the phosphor sheet 41. The package 250 is configured in such a manner that the primary light (for example, blue light) emitted by the top-surface light emitting type LED 251 through a light emitting surface 251A is supplied to the primary light entering surface 41A of the phosphor sheet 41 through a front side opening of the package 250.

The side surface of the package 250 that is defined by the reflecting member 252 and surrounds the light emitting surface 251A is set so as to form an angle θ with respect to the normal direction of the bottom surface. The reflecting member 252 suppresses the light emitted by the LED 251 from spreading in the direction parallel to the light emitting surface 251A, and the light from the LED 251 is supplied to an area on the first surface 42A of the reflection sheet 42 defined by the angle θ between an edge surface of the LED 251 and the normal direction of the bottom surface. The light emitted by the LED 251 can effectively exit toward the first surface 42A side of the reflection sheet 42 by forming the through hole 42H in the reflection sheet 42 so as to include the area. The through hole 42H is preferably formed to include the area and not to be greater than the area. Since the rest of the area of the reflection sheet 42 except for the above area is the non-transmission section 42N, the light rays that try to travel toward the phosphor sheet 41 from the outside of the first surface 42A are reflected by the non-transmission section 42N. This suppresses color unevenness caused by the multi-wavelength conversion and increases the light use efficiency.

(12) As described above, the backlight unit 220 (the lighting unit) according to the second embodiment further includes the reflecting member 252 (a light diffusion suppressing member) that is disposed to surround the light emitting surface 251A of the LED 251 (the light source) through which the primary light is emitted. The reflecting member 252 surrounds the light emitting surface 251A except for an opening that opens toward the phosphor sheet 41 and suppresses the light from spreading in the direction parallel to the light emitting surface 251A.

According to the above configuration, the light emitted by the LED 251 is reflected by the reflecting member 252 toward the specific area of the phosphor sheet 41 (the wavelength conversion member). Accordingly, the incident angle of the light at which the light enters the phosphor sheet 41 is restricted to reduce the amount of light rays to be multi-reflected. As a result, color unevenness caused by the multi-wavelength conversion is suppressed. With the configuration of the reflecting member 252 having the opening such that the light is supplied toward the through hole 42H (the light transmission area) in the reflection sheet 42 (the reflection layer), the light exit efficiency of the backlight unit is increased and brightness is increased. The increase in the amount of light rays that exit through the through holes 42H and a steep light distribution are particularly useful to obtain the display device that performs the local dimming control. Specifically, as the light distribution becomes steep, a certain pixel of the liquid crystal panel 10 is less likely to be influenced by the light sources near the certain pixel and a calculation burden of calculation for correction estimation of pixel data can be reduced. As a result, the display device that can perform the local dimming control and display high quality images can be produced at cost while suppressing a required burden of the calculating means for the local dimming control.

Third Embodiment

A third embodiment will be described with reference to FIGS. 8 and 9. A liquid crystal display device 3 according to the present embodiment differs from the backlight unit 20 according to the first embodiment in that an edge-light type backlight unit 320 is included and the LEDs 251 with a chip scale package (CSP) are used as the light source. The package 250 including the LED 251 therein as the light source has the configurations similar to those in the second embodiment.

Figure 8:
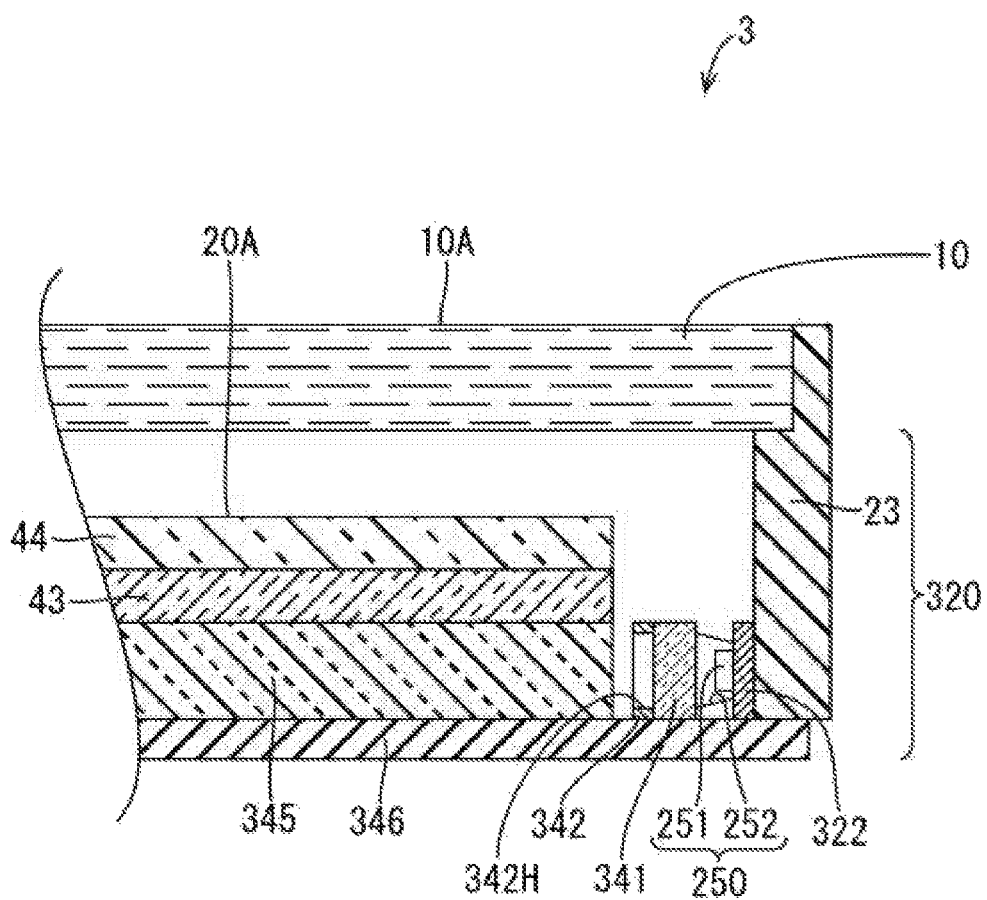
FIG. 8 is a cross-sectional view illustrating a general configuration of a liquid crystal display device according to a third embodiment.

FIG. 8 is an enlarged view illustrating an edge section of a backlight unit 320. The backlight unit 320 may be any edge-light type backlight unit that includes a known basic configuration of the edge-light type backlight unit without any limitation. For example, the backlight unit 320 illustrated in FIG. 8 includes the brightness enhancement sheet 44, a light guide plate 345 disposed on a back surface side of the diffuser sheet 43, and the packages 250. The brightness enhancement sheet 44 is disposed directly below the image display surface 10A of the liquid crystal panel 10. The packages 250 including the respective LEDs 251, which is the light source, are disposed opposite an edge surface of the light guide plate 345. The packages 250 are disposed such that the light exits toward the edge surface of the light guide plate 345. Namely, in the backlight unit 320, the exit direction L1 of the primary light is parallel to the image display surface 10A. The packages 250 are mounted on a LED board 322 that is disposed substantially vertical to the image display surface 10A and along the side wall of the frame 23. A bottom surface reflection sheet 346 that reflects light is mounted on a back surface side of the light guide plate 345 to cover the opening of the frame 23 on the back surface side. The packages 250 are disposed opposite at least one of the four edge surfaces of the light guide plate 345 and may be disposed opposite multiple edge surfaces.

A known light guide plate can be used for the light guide plate 345 without any limitation. The light that has entered the light guide plate 345 through the edge surface that is opposite the packages 250 travels therein farther away from the light sources and toward the front side (the light exit side, the liquid crystal panel 10 side) and planar light exits the light guide plate 345. The light guide plate 345 may be configured to become thicker as it extends farther away from the edge surface that is opposite the packages 250. The light guide plate 345 is made of synthetic resin (acrylic resin such as PMMA or polycarbonate resin) that has a refractive index sufficiently greater than that of air and substantially transparent (highly transmissive). The light that has exited the light guide plate 345 through the front surface passes through the diffuser sheet 43 and the brightness enhancement sheet 44 while providing the certain optical effects to the light. Then, the light exits through the light exit surface 20A.

A known reflection sheet can be used for the bottom surface reflection sheet 346 without any limitation. The bottom surface reflection sheet 346 reflects light that has exited the light guide plate 345 through the back side surface to enter the light guide plate 345 again. The bottom surface reflection sheet 346 can increase the amount of light rays that exit toward the liquid crystal panel 10 and increase the light use efficiency and increase screen brightness of the liquid crystal display device 3. The bottom surface reflection sheet 346 may be an insulation synthetic resin sheet. The bottom surface reflection sheet 346 preferably has a front surface that is white and has good light reflectivity. The bottom surface reflection sheet 346 is preferably disposed on a back surface side of each of a reflection sheet 342, a phosphor sheet 341, the package 250, and the LED board 322 in addition to the back surface side of the light guide plate 345. According to such a configuration, the amount of light rays that exit through the back surface of the backlight unit 320 or are lost on the back surface side thereof can be reduced.

Figure 9:
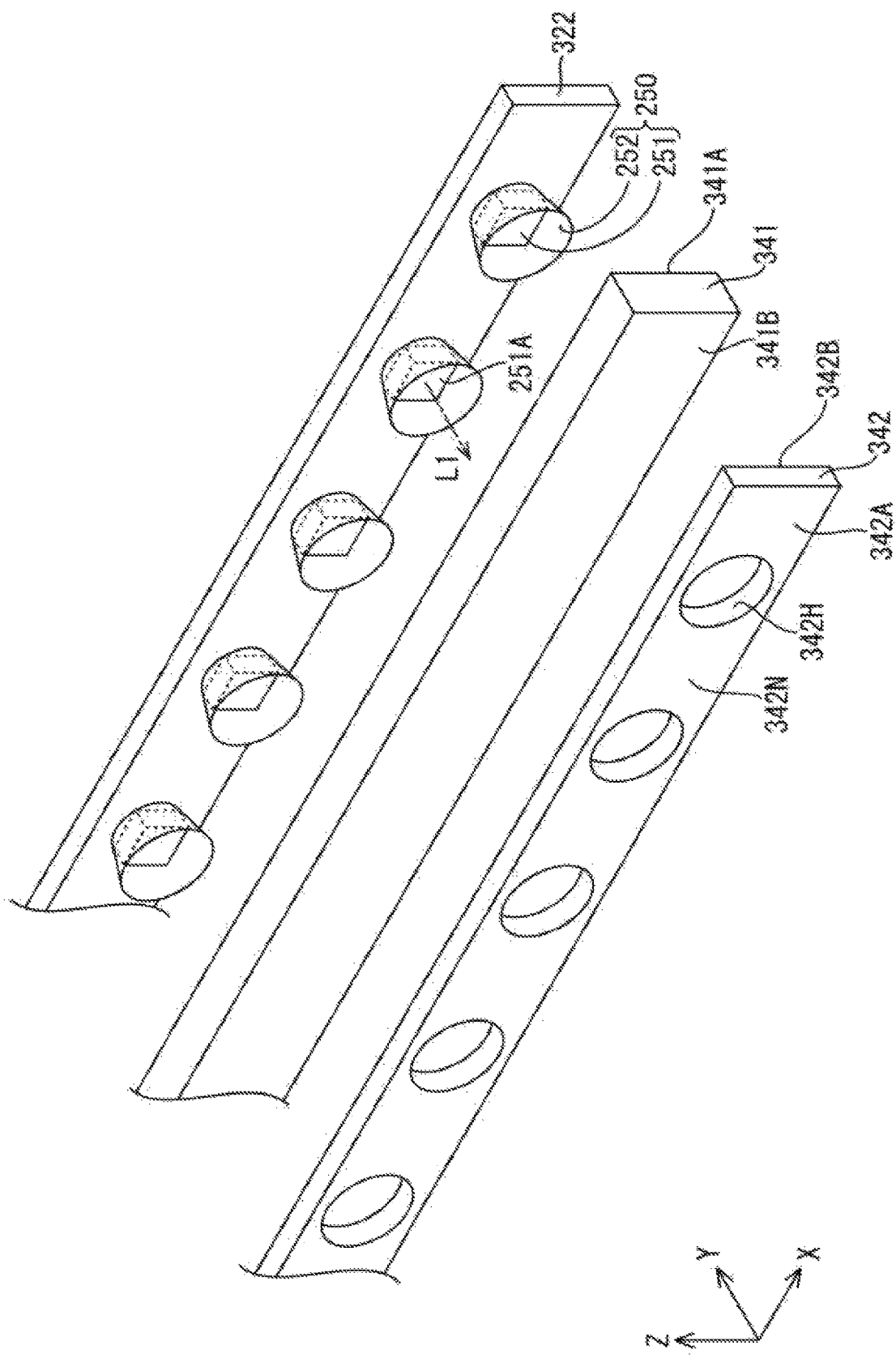
FIG. 9 is an exploded perspective view illustrating a general configuration of an optical member disposed on an edge section of the backlight unit.

As illustrated in FIG. 9, in the edge section of the backlight unit 320, the phosphor sheet 341 and the reflection sheet 342 are disposed between the packages 250 and the edge surface of the light guide plate 345. The phosphor sheet 341 and the reflection sheet 342 have the functions similar to those of the phosphor sheet 41 and the reflection sheet 42 in the first embodiment, respectively. The shape and the arrangement of the phosphor sheet 341 and the reflection sheet 342 differ from those in the first embodiment. As illustrated in FIG. 8, the phosphor sheet 341 is disposed in such a manner that a primary light entering surface 341A thereof opposite the LEDs 251 closes the openings of the packages 250 mounted on the LED board 322 without having any space therebetween. Furthermore, the reflection sheet 342 is disposed on top of the phosphor sheet 341 such that a second surface 342B is closely in contact with a secondary light exit surface 341B of the phosphor sheet 341 and the first surface 342A is disposed opposite the edge surface (the light entering surface) of the light guide plate 345. The reflection sheet 342 includes through holes 342H corresponding to the respective packages 250 that are mounted on the LED board 322. An area other than the through holes 342H is a non-transmission section 342N.

The primary light that is emitted by the packages 250 is converted to the secondary light with wavelength conversion while passing through the phosphor sheet 341 and passes through the through holes 342H in the reflection sheet 342 and enter the light guide plate 345 through the edge surface of the light guide plate 345. Most of the light rays that have been reflected by the light guide plate 345 toward the phosphor sheet 341 are reflected again and blocked by the non-transmission section 342N of the first surface 342A of the reflection sheet 342. This suppresses the multi-wavelength conversion that is caused when the light passes through the phosphor sheet 341 multiple times. The through hole 342H is preferably formed according to the angle θ of the reflecting member 252 that defines an outline of the package 250 similarly to that in the second embodiment.

(13) As described above, the backlight unit 320 (the lighting device) according to the third embodiment includes the light guide plate 345 (a light guide member) and the LEDs 251 (the light source) that are disposed opposite the edge section of the light guide plate 345. The light emitted by the LEDs 251 travels through the light guide plate 345 toward the liquid crystal panel 10 (the display panel).

According to the above configuration, the liquid crystal display device 3 (the display device) that includes the edge-light type backlight unit 320 and has good image display quality can be obtained. Particularly, such a liquid crystal display device 3 is preferably used to perform the power-saving local dimming control and useful for reducing the thickness.

Other Embodiments

The present technology is not limited to the embodiments described in the above descriptions and drawings. The following embodiments may be included in the technical scope.

(1) The above embodiments include the reflection sheet that is an isolated reflecting member as one example of the reflection layer. However, the reflection sheet is not limited to the configuration. For example, the reflection layer may be formed with coating or printing resin or metal on the secondary light exit surface of the wavelength conversion member. In such a configuration, the reflection layer may be a white ink layer including a white pigment such as titanium oxide, barium sulfate, and zinc oxide or a metal layer.

(2) The above embodiments include the through hole as the light transmission section of the reflection layer. However, the light transmission section is not limited to such a configuration. For example, the reflection layer or the reflection sheet 42 that is a white ink layer may include a section where the light transmittance thereof differs from that in another section and for example, the section may be a substantially transparent section.

(3) In the above embodiments, each of the first surface and the second surface of the reflection layer is defined into two sections of the light transmission section and the non-transmission section. However, the configuration of the reflection layer is not limited to such a configuration. For example, the reflection layer may further include a semi-transmission section where the light transmittance through the second surface and the light reflectance on the first surface of the reflection layer have an intermediate value between those of the light transmission section and those of the non-transmission section. Thus, the reflection layer may include multiple sections having different light transmittances that are varied in a stepwise manner. The light transmittance of the reflection layer can be adjusted by changing a material in a portion of the reflection layer, changing a density or a distribution of the light diffuser that is mixed in the reflection layer, or changing a thickness in a portion of the reflection layer.

Figure 10:
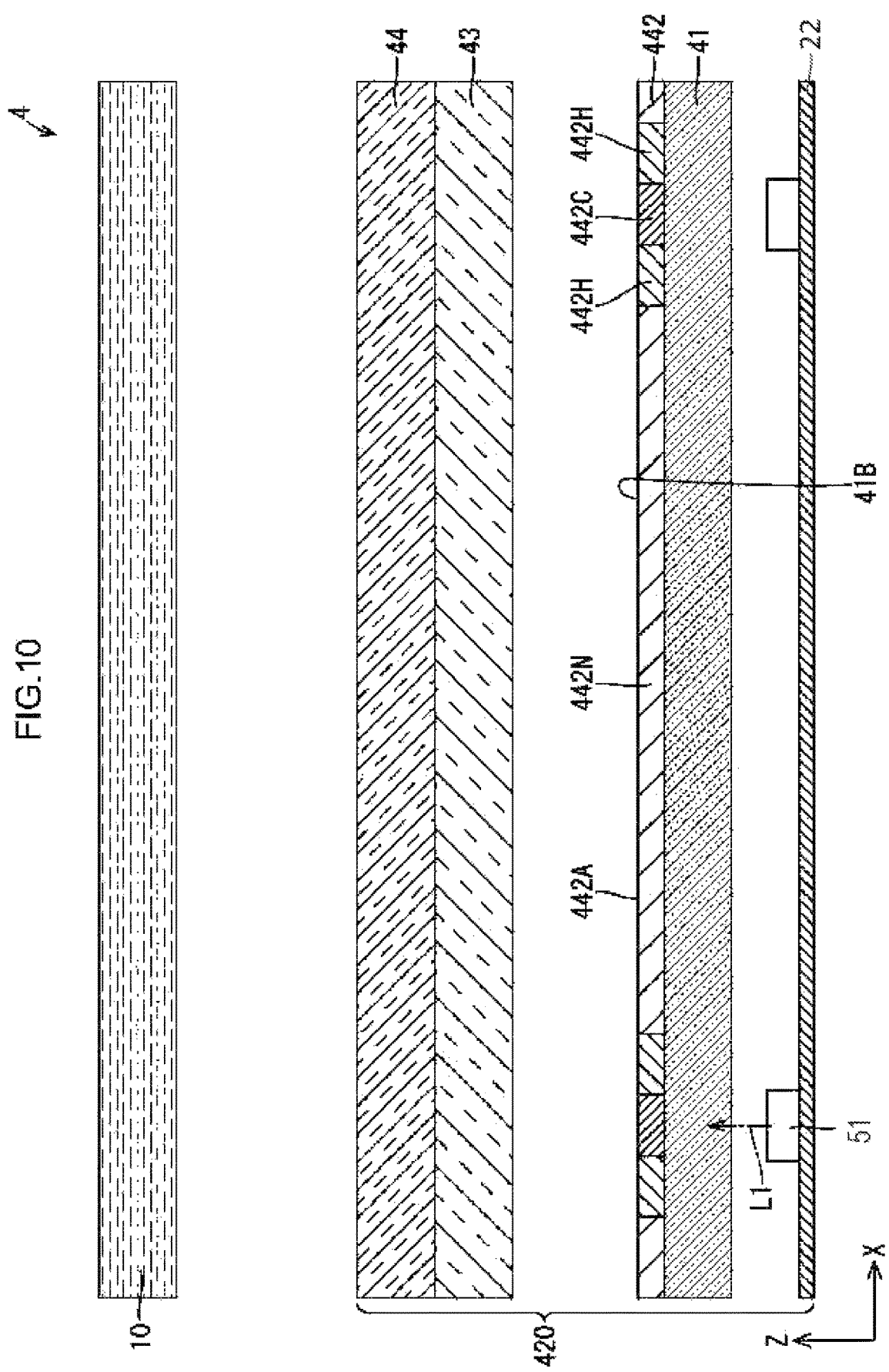
FIG. 10 is a cross-sectional view illustrating a general configuration of a liquid crystal display device 4 according to other configuration.

(4) In the above embodiments, the reflection layer includes the light transmission section that is defined in such a manner that the incident angle of the light rays that have been emitted by the light source and reached the second surface of the reflection layer is smallest. However, the configuration of the reflection layer is not limited to the above one. For example, the reflection layer may include the non-transmission section or the semi-transmission section at a position having the smallest incident angle. The liquid crystal display device 4 (the display device) illustrated in FIG. 10 includes backlight unit 420 (the lighting device). The backlight unit 420 includes a semi-transparent section 442C at a position on the reflection layer 442 having the smallest incident angle. The reflection layer 442 is disposed on the secondary light exit surface 41B of the phosphor sheet 41 (the wavelength conversion member) and includes a light transmission section 442H in a certain area around the semi-transparent section 442C and the non-transmission section 442N that is an area outside the light transmission section 442H. At the position of the reflection layer having the smallest incident angle, a density of light rays that are emitted by the LED 51 (the light source) and pass through the phosphor sheet 41 and reach the reflection layer 442 is highest and the ratio of light rays that are not reflected by each of the interfaces due to the small incident angle and exit through the first surface 442A is highest. Therefore, the light that emits through the position may locally increase the brightness of the lighting device. According to the configuration of the reflection layer 442, the light exit amount of the light rays that exit the reflection layer 442 through the first surface is maintained while suppressing brightness unevenness.

The above embodiments include the LEDs as the light source; however, the light source is not limited to the LEDs. For example, the light source may be fluorescent tubes. However, the present technology is preferably applied to the lighting device including the light source having strong directivity such as the LEDs. Particularly, since the LEDs have low power consumption properties, long-life properties, and are suitable for reducing a size, the LEDs are widely used for the backlight unit. On the other hand, since the LED has strong directivity, illuminance unevenness or chromaticity unevenness is likely to be caused. Particularly, the present technology is preferably applied to lighting devices including the LEDs as the light source.

The invention claimed is:

1. A lighting device comprising: a light source having a light emission surface through which primary light rays having wavelengths of a first wavelength region are emitted; a light source board on which the light source is mounted; a wavelength conversion member disposed opposite to the light source board and having a light entering surface that is opposite the light emission surface and a light exit surface facing a light exit side of the lighting device, the wavelength conversion member converting some of the primary light rays that enter through the light entering surface into secondary light rays having wavelength of a second wavelength region that is different from the first wavelength region, and the secondary light rays exiting the wavelength conversion member through the light exit surface; and a reflection layer disposed on the light exit surface of the wavelength conversion member and having a first surface and a second surface that is an opposite surface from the first surface and is opposite to and covering the entirety of the light exit surface of the wavelength conversion member, the reflection layer reflecting the primary and secondary light rays that reach each of the first surface and the second surface, and the reflection layer including a light transmission section above the light source, the light transmission section having an area overlapping an entire area of the light emission surface through which the secondary light rays exiting the wavelength conversion member pass toward the light exit side.

2. A display device comprising:
a display panel including an image display surface displaying an image; and
the lighting device according to claim 1.

3. The display device according to claim 2, wherein the light source is disposed directly below the image display surface.

4. The display device according to claim 2, further comprising a light guide member having an edge surface as a light entering surface that is opposite the light source, wherein
the secondary light rays passing through the light transmission section of the reflection layer travel through the light guide member toward the display panel.

5. The lighting device according to claim 1, wherein
the light source includes light sources having light emission surfaces, and
the light transmission section includes light transmission sections disposed above the light sources, respectively, and the light transmission sections have areas overlapping entire areas of the light emission surfaces, respectively.

6. The lighting device according to claim 5, wherein the areas of the light transmission sections are same.

7. The lighting device according to claim 1, wherein the light transmission section is a through hole.

8. The lighting device according to claim 1,
further comprising a light source board having a mounting surface on which the light source is mounted and that has an antiglare property.

9. The lighting device according to claim 1, wherein the light source is a light emitting diode.

10. The lighting device according to claim 1, further comprising:
a light diffusion suppressing wall member extending from the light source board to the wavelength conversion member and surrounding the light source.

11. The lighting device according to claim 1, wherein an angle between an optical axis of the primary light rays and a line extending from the light source to an edge of the light transmission section is from 40 degrees to 90 degrees inclusive.

12. The lighting device according to claim 1, wherein the area of the light transmission section is larger than the light emission surface.

13. The lighting device according to claim 1, wherein further comprising an optical sheet that is disposed on the light exit side of the reflection layer and reflects some of the secondary light rays toward the reflection layer and through which another some of the secondary light rays pass toward the light exit side.

* * * * *